(12) United States Patent
Shoham et al.

(10) Patent No.: US 10,088,973 B2
(45) Date of Patent: Oct. 2, 2018

(54) EVENT SCHEDULING PRESENTATION IN A GRAPHICAL USER INTERFACE ENVIRONMENT

(71) Applicant: GOOGLE INC., Mountain View, CA (US)

(72) Inventors: Yoav Shoham, Los Altos Hills, CA (US); Jacob E Bank, Stanford, CA (US); Karl Cobbe, Nevada City, CA (US); Annika Matta, Mountain View, CA (US); Matthew Rubin, Cambridge, MA (US); Zachary I Weiner, Berkeley, CA (US); Kumiko T Toft, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 378 days.

(21) Appl. No.: 14/076,046

(22) Filed: Nov. 8, 2013

(65) Prior Publication Data
US 2015/0135085 A1    May 14, 2015

(51) Int. Cl.
*G06F 3/0482* (2013.01)
*G06Q 10/10* (2012.01)

(52) U.S. Cl.
CPC ......... *G06F 3/0482* (2013.01); *G06Q 10/109* (2013.01); *G06Q 10/1093* (2013.01); *G06Q 10/1095* (2013.01); *G06Q 10/1097* (2013.01)

(58) Field of Classification Search
None
See application file for complete search history.

(56) References Cited

U.S. PATENT DOCUMENTS 5,813,013 A * 9/1998 Shakib ............... G06Q 10/109
7,084,758 B1 * 8/2006 Cole ................... G06Q 10/109
340/309.16

(Continued)

FOREIGN PATENT DOCUMENTS

WO    2015020941 A1    2/2015
WO    2015020948 A1    2/2015

(Continued)

OTHER PUBLICATIONS

International Preliminary Report on Patentability for PCT Patent Application No. PCT/US2014/064274, dated May 10, 2016, 6 pages.

(Continued)

*Primary Examiner* — Taghi T Arani
*Assistant Examiner* — F J Farhadian
(74) *Attorney, Agent, or Firm* — Brake Hughes Bellermann LLP

(57) ABSTRACT

A system, computer-readable storage medium storing at least one program, and computer-implemented method for presenting a set of intention objects arranged by coarse time windows is disclosed. In example embodiments, the method may include accessing a set of intention objects belonging to a user. Each of the intention objects may define the intention of the user to undertake an intention and each object may comprise a data structure including a plurality of activity attributes of the intended activity. The method may further include assigning particular intention objects of the set of intention objects to a coarse time window based on the attributes of the respective intention objects. The method may further include presenting at least a portion of the set of intention objects to a user in a day view that is arranged based on the assigned coarse time windows.

20 Claims, 21 Drawing Sheets

(56) References Cited

U.S. PATENT DOCUMENTS

| | | | | |
|---|---|---|---|---|
| 7,149,810 B1* | 12/2006 | Miller | G06Q 10/109 | 709/206 |
| 7,703,048 B2* | 4/2010 | Alford, Jr. | G06Q 10/1093 | 705/7.18 |
| 7,804,758 B2* | 9/2010 | Fukuda | G11B 7/0065 | 369/103 |
| 8,606,860 B2* | 12/2013 | Chang | G06Q 10/107 | 709/206 |
| 9,076,008 B1* | 7/2015 | Moy | G06F 21/60 | |
| 2002/0191035 A1* | 12/2002 | Selent | G06F 3/0481 | 715/866 |
| 2004/0002932 A1* | 1/2004 | Horvitz | G06N 99/005 | 706/46 |
| 2004/0078436 A1* | 4/2004 | Demsky | H04L 67/306 | 709/206 |
| 2005/0268501 A1* | 12/2005 | Feinstein | G09D 3/00 | 40/110 |
| 2006/0064411 A1* | 3/2006 | Gross | G06F 17/30864 | |
| 2006/0200374 A1* | 9/2006 | Nelken | G06Q 10/109 | 705/7.19 |
| 2007/0043811 A1* | 2/2007 | Kim | G06Q 10/06 | 709/203 |
| 2007/0219874 A1* | 9/2007 | Toulotte | G06Q 10/109 | 705/14.39 |
| 2007/0219875 A1* | 9/2007 | Toulotte | G06Q 10/109 | 705/26.7 |
| 2007/0288279 A1* | 12/2007 | Haugen | G06Q 10/109 | 705/7.21 |
| 2007/0300163 A1* | 12/2007 | Alford | G06Q 10/109 | 715/751 |
| 2008/0005075 A1* | 1/2008 | Horvitz | G06F 17/30864 | |
| 2008/0033779 A1* | 2/2008 | Coffman | G06Q 10/109 | 705/7.18 |
| 2008/0056071 A1* | 3/2008 | Burtner | G06Q 10/10 | 368/28 |
| 2008/0147483 A1* | 6/2008 | Ji | G06Q 10/10 | 705/7.32 |
| 2008/0162252 A1* | 7/2008 | Lee | G06Q 10/06311 | 705/7.16 |
| 2008/0244425 A1* | 10/2008 | Kikin-Gil | G06Q 10/109 | 715/764 |
| 2008/0250334 A1* | 10/2008 | Price | G06Q 10/109 | 715/753 |
| 2009/0177513 A1* | 7/2009 | Eckhart | G01C 21/343 | 705/7.18 |
| 2009/0320047 A1* | 12/2009 | Khan | G06F 9/542 | 719/318 |
| 2010/0082376 A1* | 4/2010 | Levitt | G06Q 10/06311 | 705/7.18 |
| 2010/0082624 A1* | 4/2010 | Martin | G06F 17/30041 | 707/737 |
| 2010/0122090 A1* | 5/2010 | Dean | G06F 21/54 | 713/168 |
| 2010/0122190 A1* | 5/2010 | Lu | G06Q 10/06311 | 715/764 |
| 2010/0175001 A1* | 7/2010 | Lazarus | G06Q 10/109 | 715/753 |
| 2010/0274865 A1* | 10/2010 | Frazier | G06Q 10/00 | 709/207 |
| 2010/0311470 A1* | 12/2010 | Seo | G06F 3/04883 | 455/566 |
| 2011/0040756 A1* | 2/2011 | Jones | G06F 17/30864 | 707/737 |
| 2011/0184943 A1* | 7/2011 | Norton | G06Q 10/02 | 707/723 |
| 2011/0270517 A1* | 11/2011 | Benedetti | G01C 21/20 | 701/533 |
| 2011/0314404 A1* | 12/2011 | Kotler | G06Q 10/109 | 715/772 |
| 2012/0035925 A1* | 2/2012 | Friend | G06F 3/167 | 704/235 |
| 2012/0084248 A1* | 4/2012 | Gavrilescu | G06F 17/30867 | 706/52 |
| 2012/0158589 A1* | 6/2012 | Katzin | G06Q 20/12 | 705/44 |
| 2012/0166565 A1* | 6/2012 | Hardy | G06Q 10/109 | 709/206 |
| 2012/0232946 A1* | 9/2012 | Cocanougher | G06Q 10/109 | 705/7.19 |
| 2012/0239451 A1* | 9/2012 | Caligor | G06Q 10/00 | 705/7.21 |
| 2012/0290956 A1* | 11/2012 | Lance | G06Q 10/1093 | 715/764 |
| 2013/0024364 A1* | 1/2013 | Shrivastava | G06Q 20/38 | 705/39 |
| 2013/0024371 A1* | 1/2013 | Hariramani | G06Q 20/351 | 705/41 |
| 2013/0073329 A1* | 3/2013 | Shoham | G06Q 10/10 | 705/7.18 |
| 2013/0151637 A1* | 6/2013 | Bedikian | H04L 67/22 | 709/206 |
| 2013/0166332 A1* | 6/2013 | Hammad | G06Q 40/10 | 705/5 |
| 2013/0179272 A1* | 7/2013 | Bonev | G06Q 10/109 | 705/14.66 |
| 2013/0190189 A1* | 7/2013 | Griffiths | C12N 15/1062 | 506/1 |
| 2013/0254660 A1* | 9/2013 | Fujioka | A63F 13/12 | 715/707 |
| 2013/0289858 A1* | 10/2013 | Mangiat | G05D 1/0027 | 701/117 |
| 2014/0075352 A1* | 3/2014 | Hansen | G06F 9/4451 | 715/765 |
| 2014/0075385 A1* | 3/2014 | Wan | G06Q 10/1093 | 715/812 |
| 2014/0129371 A1* | 5/2014 | Wilson | G06Q 30/0631 | 705/26.7 |
| 2014/0164358 A1* | 6/2014 | Benzatti | G06Q 10/109 | 707/722 |
| 2014/0188886 A1* | 7/2014 | Mahaffey | G06F 17/30598 | 707/740 |
| 2014/0225897 A1* | 8/2014 | Sarrazin | G06Q 10/109 | 345/467 |
| 2014/0316835 A1* | 10/2014 | Cortes | G06Q 10/1095 | 705/7.19 |
| 2014/0337175 A1* | 11/2014 | Katzin | G06Q 20/204 | 705/26.62 |
| 2015/0046210 A1* | 2/2015 | Shoham | G06Q 10/1097 | 705/7.21 |
| 2015/0046211 A1* | 2/2015 | Shoham | G06Q 10/1097 | 705/7.21 |
| 2015/0046440 A1* | 2/2015 | Shoham | G06F 17/30699 | 707/728 |
| 2015/0095086 A1* | 4/2015 | Gopinath | G06Q 10/1093 | 705/7.18 |
| 2015/0135085 A1* | 5/2015 | Shoham | G06F 3/0482 | 715/739 |
| 2015/0161569 A1 | 6/2015 | Yoav et al. | | |
| 2015/0193722 A1 | 7/2015 | Seaman et al. | | |
| 2015/0346944 A1* | 12/2015 | Zhou | G06F 3/0488 | 715/765 |
| 2016/0073216 A1* | 3/2016 | Malatack | H04M 7/0036 | 455/414.1 |
| 2016/0216954 A1* | 7/2016 | Jitkoff | G06F 8/61 | |

FOREIGN PATENT DOCUMENTS

| | | |
|---|---|---|
| WO | 2015020957 A1 | 2/2015 |
| WO | 2015088845 | 6/2015 |

OTHER PUBLICATIONS

Final Office Action for U.S. Appl. No. 14/101,081, dated Oct. 31, 2016, 25 pages.
Final Office Action for U.S. Appl. No. 13/961,516, dated Nov. 5, 2015, 27 Pages.

(56) References Cited

OTHER PUBLICATIONS

Non Final Office Action for U.S. Appl. No. 13/961,516, dated Mar. 9, 2016, 31 Pages.
Non Final Office Action for U.S. Appl. No. 13/961,516, dated Jul. 2, 2015, 19 pages.
Response to Final Office Action for U.S. Appl. No. 13/961,516, filed Feb. 4, 2016, 10 pages.
Response to Office Action for U.S. Appl. No. 13/961,516, filed Oct. 2, 2015, 11 pages.
Final Office Action for U.S. Appl. No. 13/961,559, dated Nov. 5, 2015, 28 Pages.
Final Office Action Response for U.S. Appl. No. 13/961,559, filed Feb. 4, 2016, 12 pages.
Non Final Office Action for U.S. Appl. No. 13/961,559, dated Mar. 9, 2016, 31 Pages.
Non Final Office Action for U.S. Appl. No. 13/961,559, dated Jul. 16, 2015, 21 pages.
Response to Non-Final Office Action for U.S. Appl. No. 13/961,559, filed Oct. 15, 2015, 14 pages.
Advisory Action for U.S. Appl. No. 13/961,609, dated Nov. 3, 2015, 3 pages.
Final Office Action for U.S. Appl. No. 13/961,609, dated Aug. 26, 2015, 15 pages.
Non-Final Office Action for U.S. Appl. No. 13/961,609, dated Apr. 17, 2015, 20 pages.
Non-Final Office Action for U.S. Appl. No. 13/961,609, dated Dec. 18, 2015, 14 Pages.
Notice of Allowance for U.S. Appl. No. 13/961,609, dated Apr. 18, 2016, 7 Pages.
Response to Office Action for U.S. Appl. No. 13/961,609, filed Mar. 3, 2016, 17 pages.
U.S. Appl. No. 14/101,081, Non Final Office Action dated Jun. 2, 2016, 23 pages.

* cited by examiner

EVENT SCHEDULING PRESENTATION IN A GRAPHICAL USER INTERFACE ENVIRONMENT

TECHNICAL FIELD

Example embodiments of the present application generally relate to task management and, more particularly, to a system and method for providing intelligent task management services to users.

BACKGROUND

Classically, task management involved creating and maintaining one or more paper to-do lists. With the proliferation of mobile computing, task management is now typically handled electronically by way of task management software tools. Traditional task management software tools allow users to manage multiple tasks on multiple task lists, share tasks with other users, set alerts and reminders for certain tasks, and prioritize tasks based on the wishes of the user.

The task lists of traditional task management tools are often outdated, unstructured, and incomplete or unmanageably long. The information for describing individual tasks is often scant, containing little more than a subject and a due date. As a result, the tasks on these lists are often mismanaged and quickly become irrelevant or moot due to the passing of time or a change in other circumstances. Further, although these task management tools allow users to schedule tasks, they do not assist users in determining when to schedule certain tasks or how to prioritize each task on the list of tasks. Moreover, traditional task management tools do not assist users in tracking available time at which one or more tasks may be performed. Additionally, traditional task management tools provide little assistance to users in actually undertaking or completing the tasks on the task lists.

BRIEF DESCRIPTION OF THE DRAWINGS

Some embodiments are illustrated by way of example and not limitation in the figures of the accompanying drawings.

DETAILED DESCRIPTION

Figure 1:
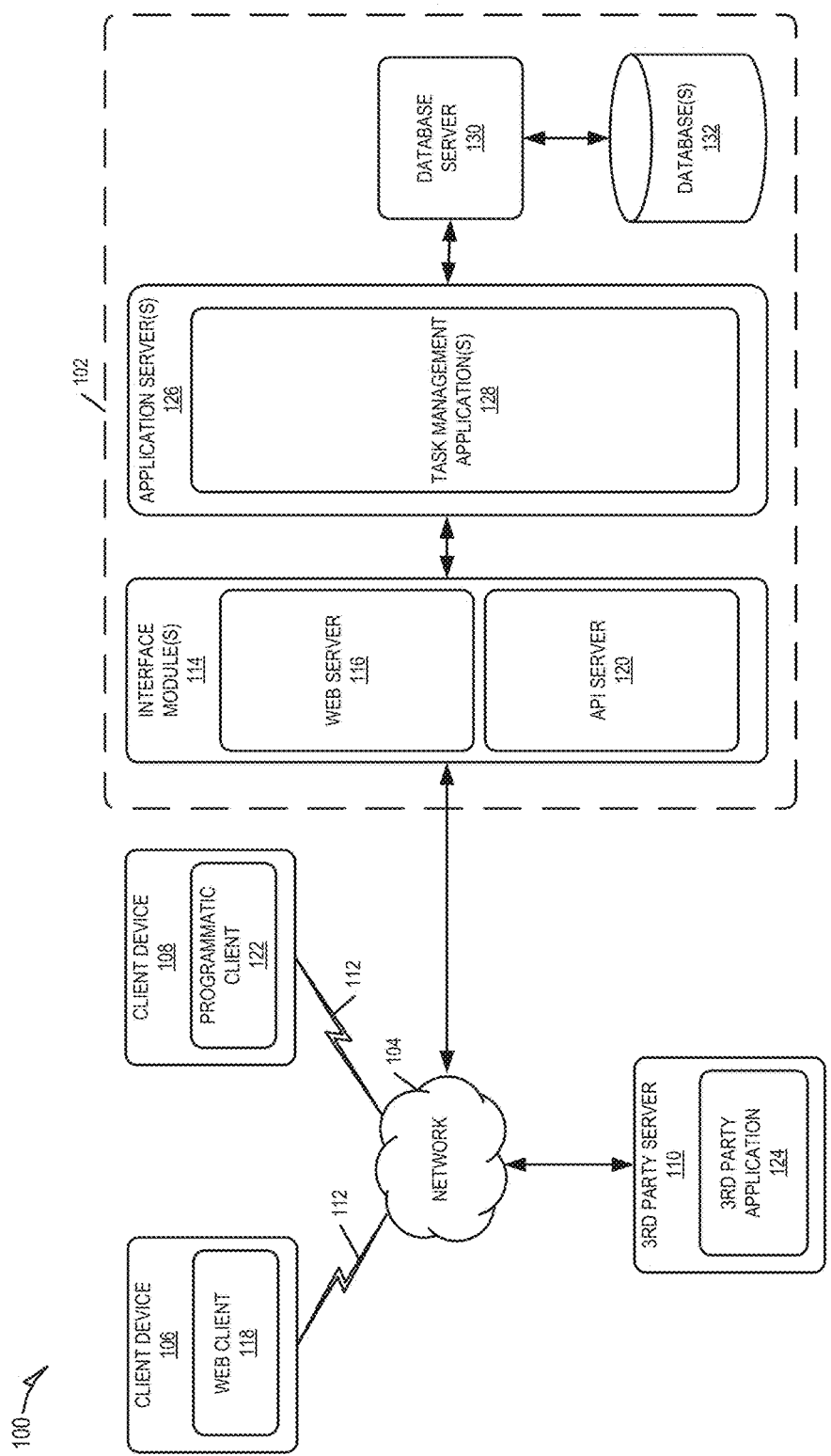
FIG. 1 is a network diagram depicting a data exchange platform having a client-server architecture configured for providing task management services over a network, according to an example embodiment.

Reference will now be made in detail to specific example embodiments for carrying out the inventive subject matter. Examples of these specific embodiments are illustrated in the accompanying drawings. It will be understood that it is not intended to limit the scope of the claims to the described embodiments. On the contrary, it is intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Aspects of the present disclosure describe systems and methods for intelligent task management services including generating an intention object. In example embodiments, the method may include obtaining activity data that defines a plurality of activity attributes of an intention of a user to undertake an activity and obtaining content data including one or more content items related to undertaking the activity. The plurality of activity attributes may include temporal attributes defining time constraints related to the intended activity and contextual attributes that identify contexts related to the intended activity. The data may be obtained from user input or from one or more communications received by the user related to the activity. In some embodiments, the plurality of activity attributes may also include categorical attributes defining a category or type of activity and dependency attributes related to one or more associated activities or users.

Consistent with this embodiment, an intention object may be generated based on the plurality of activity attributes. The intention object may comprise a data structure including the plurality of activity attributes and the content data. The method may further include inferring an additional attribute of the intention object and updating the intention objects based on the additional object. Each generated intention object may simultaneously reside in an intention object collection and one or more communications (e.g., email, calendar invite, etc.) or calendar events. Each generated intention object may have a number of different actions that may be taken with regard to the intention objects themselves (e.g., sharing via email) and a number of different executable actions that may be executed with regard to the respective activities of the intention object. A particular intention object may persist regardless of the actions taken with respect to that object.

As an illustrative example, a user may receive an email confirming a dentist appointment at the dentist's office that same day at 2:30 PM. The system may then analyze the email to obtain the activity attributes defining the user's intended activity, which in this example is the dentist appointment. The activity attributes obtained from the email may include the date and time of the appointment (e.g., a temporal attribute) and the location of the appointment (e.g., a contextual attribute), which in this case is the dentist's office. An intention object including these obtained activity attributes may then be created. A travel time (e.g., an additional attribute) of 15 minutes may then be inferred based on the current location of the user and the location of the dentist's office. The intention object may then be updated to include the inferred attributes.

Aspects of the present disclosure describe systems and methods for intelligent task management services including selectively presenting a user with a collection of intention objects. In example embodiments, the method may include accessing a collection of intention objects belonging to the user. Each of the intention objects may comprise a data structure including a plurality of activity attributes of an intended activity. The plurality of activity attributes may comprise temporal attributes and contextual attributes including a location associated with the intended activity.

Consistent with this embodiment, the method may also include determining a relevancy rank for each of the collection of intention objects based on the plurality of activity attributes corresponding to each intention object. The relevancy rank indicates a suggested order in which the user undertakes each of the respective activities. Upon determining the relevancy rank of each intention object, one or more intention objects with a relevancy rank above a predefined threshold are identified. Graphical representations of the above-threshold intention objects may be presented to the user in a free form spatial interface. In some embodiments, the identified intention objects may be presented to a user in an order listed with the order of the intention objects determined based on the respective relevancy rank.

Continuing with the example presented above, in addition to the dentist appointment intention object, the user may have created an additional intention object for rearranging his sock drawer, which includes a temporal attribute indicating that the duration of this activity is 30 minutes. The user may have created another intention object for a date with his wife at a time and location to be determined at a later time. The user's collection of intention objects may thus comprise the intention objects for the dentist appointment, rearranging the sock drawer, and the date with his wife. A relevancy rank is then determined for each intention object, and assuming each intention object is above the predefined threshold, a graphical representation of each intention object is presented to the user in a free form spatial canvas. If the user is home and it is before 1:15 PM, the rearranging sock drawer intention object may have the highest relevancy ranking, followed by the dentist office intention object, and then finally the date with his wife. The intention objects may be presented to the user in this order in an ordered list.

In some embodiments, the method may also include determining an updated relevancy rank for each intention object and identifying a particular intention object with an updated relevancy rank that is below the threshold. In response to the particular intention object being below the threshold, the particular intention object is removed from the free form spatial interface and from the ordered list.

Following the above example, an updated relevancy ranking for each intention object may be determined in response to the time of day being later than the dentist appointment without the user indicating that the dentist appointment was completed. The updated relevancy rank of the dentist appointment may then be determined to be below the predefined threshold. As a result, the graphical representation of the dentist appointment intention object may be removed from the free form spatial interface.

Aspects of the present disclosure describe systems and methods for intelligent task management services including providing scheduling suggestions to a user. In example embodiments, the method may include accessing a collection of intention objects belonging to the user. Each of the intention objects may be comprised of a data structure including a plurality of activity attributes defining an intention of the user to undertake an intended activity. The plurality of activity attributes may comprise temporal attributes and contextual attributes including a location associated with the intended activity.

Consistent with this embodiment, the method may also include accessing calendar data from a calendar of the user and determining an available time slot on the calendar. In response to determining the available time slot, a suggested intention object is selected from the collection of intention objects. The selection of the suggested intention object may be based on one or more of the plurality of activity attributes of the suggested intention object. The user may then be provided a scheduling suggestion including a suggestion to schedule the activity associated with the suggested intention object in the available time slot. In response to receiving approval of the suggestion by the user, the activity is scheduled in the available time slot.

Following the example from above, the calendar of the user may be accessed and it may be determined that the user currently has a 30 minute opening in his schedule. If the user is home (e.g., the location of his sock drawer), the user may then be provided with a suggestion to rearrange his sock drawer. Upon approval from the user, the rearranging of the sock drawer activity may be scheduled on the user's calendar. Alternatively, it may be determined that the user has a 2 hour opening in his schedule later that day. The user may then be provided a suggestion to schedule a date with his wife during that available time slot. Upon approval from the user, the date with his wife may be scheduled on the user's calendar.

Aspects of the present disclosure describe systems and methods for assigning intentions to coarse time windows and the presentation of intention objects in a day view arranged by the coarse time windows. In example embodiments, the method may include accessing a set of intention objects. Each of the intention objects may comprise a data structure including a plurality of activity attributes of an intended activity. The method may further include assigning particular intention objects of the collection of intention objects to a coarse time window. Consistent with some embodiments, the assigning of intention objects to a coarse time window may be based on the attributes of the respective intention objects. The method may further include presenting at least a portion of the collection of intention objects to a user in a day view that is arranged based on the assigned coarse time windows. Consistent with this embodiment, a user may create new intention objects and have them quickly assigned to a coarse time window.

As an illustrative example, a collection of intention objects belonging to a particular user may each have a start or due date on a particular day. The user may be presented with a day view of these intention objects, which may provide the user with a list of all activities for the particular day. The day view may be organized according to a number of coarse time windows based on the periods of the day. Accordingly, the day view may include a section for the "Morning," "Afternoon," and "Evening." Each of the intention objects may be assigned to one of these coarse time windows based on the attributes of the respective intention object. For example, a particular intention object with a start time of 9:00 A.M. may be assigned to the "Morning" window.

Consistent with this illustrative example, a new intention object expressing the intention of a user to undertake a new activity may be created and committed to being undertaken in the "Afternoon." A graphical representation of this new intention object may subsequently be included in the day view within the "Afternoon" window.

FIG. 1 is a network diagram depicting an example network system 100, according to one embodiment, having a client-server architecture configured for exchanging data over a network. Although the system 100 illustrated in FIG. 1 employs a client-server architecture, the present inventive subject matter is, of course, not limited to such an architecture, and could equally well find application in an event-driven, distributed, or peer-to-peer architecture system, for example.

The network system 100 may include a data exchange platform 102 where clients may communicate and exchange data within the network system 100. The data exchange platform 102 may provide server-side functionality, via a network 104 (e.g., the Internet), to one or more client devices 106, and 108, and to one or more third party servers 110. The client devices 106 and 108 may be executing conventional web browser applications, or applications that have been developed for a specific platform or operating system (e.g., iOS, Android, etc.). The client devices 106 and 108 may, for example, be any of a variety of types of devices including a cellular telephone, a personal digital assistant (PDA), a personal navigation device (PND), a handheld computer, a tablet computer, a desktop computer, a notebook computer, a wearable computing device, or other type of movable device.

The client devices 106 and 108 may communicate with the communication network 104 via a connection 112. Depending on the form of the client device 106 and 108, any of a variety of types of connections 112 and communication networks 104 may be used. For example, the connection 112 may be code division multiple access (CDMA) connection, a Global System for Mobile communications (GSM) connection, or other type of cellular connection. In another example, the connection 112 may be wireless fidelity (Wi-Fi, IEEE 802.11x type) connection, a Worldwide Interoperability for Microwave Access (WiMAX) connection, or another type of wireless data connection. In yet another example, the connection 112 may be a wired connection, such as an Ethernet link, and the communication network 104 may be a local area network (LAN), a wide area network (WAN), the Internet, or other packet-switched data network.

The one or more client devices may be operated by the users of the data exchange platform 102 to exchange data over the network 104. In various embodiments, the data exchanges within the network system 100 may be facilitated by one or more interface modules 114. The interface modules 114 are coupled to, and provide programmatic and web interfaces respectively to, one or more application servers 126. The interface modules 114 may receive requests from various client-computing devices 106 and 108, and communicate appropriate responses to the requesting client devices 106 and 108. For example, the user interface module(s) 114 may receive requests in the form of Hypertext Transport Protocol (HTTP) requests, or other web-based, application programming interface (API) requests.

In various embodiments, the interfaces provided by the interface modules 114 depend on the particular client device 106 or 108 being used. For example, the web server 116 may provide web interfaces to the client device 106 using web client 118. The API server 120 may provide programmatic access to the client device 108 using a programmatic client 122, such as a client application, or to a third party server 110 (e.g., one or more servers or client devices) hosting a third party application 124. The third party application 124 may use information retrieved from the data exchange platform 102 to support one or more features or functions on a website hosted by the third party. In some embodiments, the data exchange platform 102 may use information retrieved from a third party website hosted by the third party server 110 to support one or more task management features discussed herein. The third party website may, for example, provide one or more calendaring or communication (e.g., email) services that are supported by the relevant applications of the data exchange platform 102.

The application servers 126 host one or more of the task management services discussed herein. The application servers 126 may be coupled via the interface modules 114 to the communication network 104, for example, via wired or wireless interfaces. The application servers 126 are, in turn, coupled to one or more database server(s) 130 that facilitate access to one or more database(s) 132. In some examples, the application servers 126 can access the database(s) 132 directly without the need for a database server 130. In some embodiments, the databases 132 may include databases 132 both internal and external to the data exchange platform 102.

Figure 2:
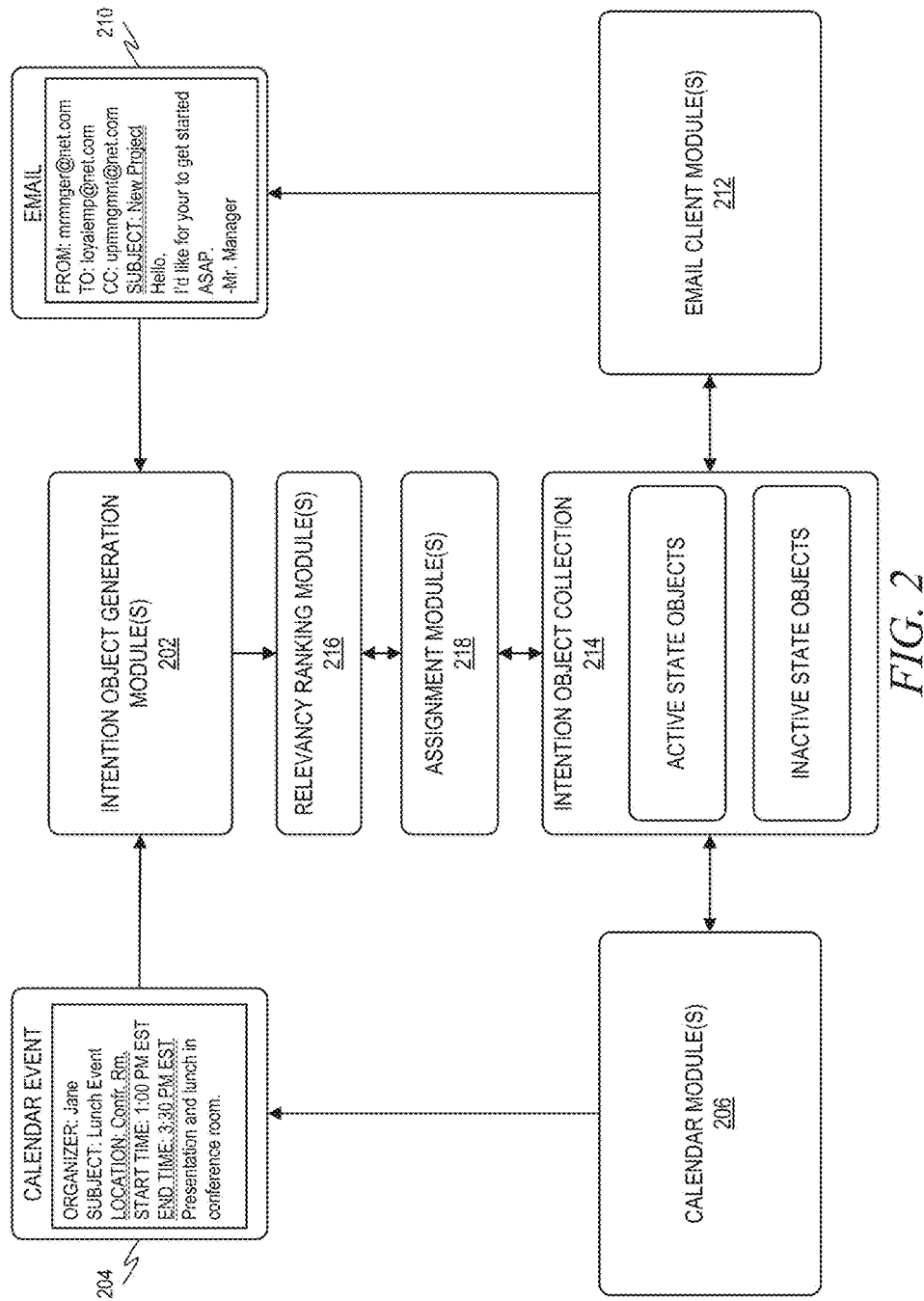
FIG. 2 is a block diagram illustrating an example embodiment of multiple task management applications, which are provided as part of the data exchange platform.

FIG. 2 is a block diagram illustrating an example embodiment of the interactions of multiple modules forming the task management application 128, which are provided as part of the task data exchange platform 102. Each of the modules illustrated in FIG. 2 may be hosted on a dedicated or shared server machine (e.g., application server 126) that is communicatively coupled to enable communication with one or more additional server machines. Each of the modules illustrated in FIG. 2 are communicatively coupled (e.g., via appropriate interfaces) to each other and to various data sources (e.g., third party server 110) so as to allow information to be passed between each of the modules or so as to allow the modules to share and access common data. The modules illustrated in FIG. 2 may furthermore access one or more databases 132 via the database servers 130.

As illustrated in FIG. 2, the modules forming the task management application 128 may include an intention object generation module(s) 202, calendar module(s) 206, email client module(s) 212, intention object collection 214 and relevancy ranking module(s) 216. It will be appreciated that one or more of the various modules forming the task management application 128 may be combined into a single module. Further, in some embodiments, one or more modules may be omitted and additional modules may also be included. Additionally, while the modules illustrated in FIG. 2 are discussed below in the plural sense, it should be noted that a single version of the module may be utilized.

The intention object generation modules 202 may be configured to generate intention objects. In some embodiments, the intention object generation modules 202 may generate an intention object in response to and based on user input entered via a user interface provided by the interface modules 114. Consistent with this embodiment, a user may specify a plurality of activity attributes that may define an intended activity. The plurality of activity attributes may collectively define an intention of the user to undertake an activity. The plurality of activity attributes may, for example, include a title, an activity or task, temporal attributes, contextual attributes and other content. Further details of the data elements and information forming an intention object are discussed below in reference to FIG. 3.

In some embodiments, the intention object generation module 202 may obtain activity data defining one or more activity attributes from one or more communications (e.g., email, calendar invitations, instant messages, text messages, etc.) received by the user. For example, as illustrated in FIG. 2, the intention object generation module 202 may retrieve a calendar event 204 from one or more calendar modules 206. The intention object generation module 202 may analyze and parse the retrieved calendar event 204 to determine the one or more attributes from the information contained therein. The intention object generation module 202 may also infer one or more additional attributes based on the determined one or more attributes.

The source of the calendar data used by the calendar modules 206 may be one or more databases 132 or a storage medium contained in the client device 106. The calendar data may alternatively be retrieved, via API, from one or more third party calendar applications or services hosted by the third party server 110.

As illustrated in FIG. 2, the intention object generation module 202 may alternatively obtain the one or more attributes from an email 210 from email client modules 212. The email 210 may be automatically obtained from the email client modules 212 or in response to user input. In some embodiments, the email 210 is automatically retrieved by the intention object generation module 202 based on the content of the email 210. As with the calendar event 204, the intention object generation module 202 may analyze and parse the retrieved email 210 to determine the one or more attributes from the information contained therein. The intention object generation module 202 may also be configured to infer one or more additional attributes based on the one or more attributes.

The source of the email 210 obtained from the email client modules 212 may be one or more databases 132 or a storage medium contained in the client device 106. The email 210 may alternatively be retrieved, via API, from one or more third party email applications or services (e.g., Gmail, Hotmail, Y mail, etc.) hosted by the third party server 110.

Each intention object generated by the intention object generation module 202 may be added to an intention object collection 214. Each user of the data exchange platform 102 may have a corresponding intention object collection 214. The intention object collection 214 may be stored in one or more databases 132 and subsequently accessed by a client device (e.g., client device 106) of the user. In some embodiments, the intention object collection 214 may be stored locally in a machine readable storage medium of the client device 106.

Intention objects included in the intention object collection 214 may be stored in either an inactive or active state. The state of each intention object may be based on a relevancy rank determined by a relevancy ranking modules 216. The relevancy rank may provide an indication of a suggested order in which the user undertakes each respective activity of the collection of intention objects 214. The relevancy rank of each intention object may be determined based on the one or more attributes comprising the intention object. Intention objects with a relevancy rank above a predefined threshold (e.g., above-threshold intention objects) may be placed in an active state. Active state intention objects included in the intention object collection 214 may be presented to a user via a user interface provided by the interface modules 114. Conversely, intention objects with a relevancy rank below a predefined threshold may be placed in an inactive state and may not be displayed to the user.

The calendar modules 206 may provide a number of scheduling and calendaring services to users. To this end, the calendar modules 206 may provide a calendar interface that enables users to view, add, and remove calendar events to particular dates and times. Calendar events may be generated based on user input, or based on one or more intention objects. In some embodiments, an intention object may be added to the calendar of a user based on user input. For example, a user operating a client device 106 with a touch sensitive display may add a particular intention object to the calendar via a single touch gesture (e.g., a swipe, a touch, etc.). In some embodiments, the calendar modules 206 may access the collection of intention objects 214 and select one or more intention objects to be automatically scheduled as a calendar event based on the one or more attributes of the intention object.

Consistent with some embodiments, the calendar modules 206 may be configured to access calendar data of a user and analyze the data to determine open time slots in the schedule of the user. The calendar modules 206 may subsequently access the intention object collection 214 and select one or more intention objects to suggest to the user for scheduling in the open time slot. The one or more intention objects may then be scheduled as calendar events in response to receiving the approval of the user. The scheduled calendar events may include the activity attributes and may maintain a reference to the intention object.

The email client modules 212 may host an email inbox for each user and provide a number of email services to each user including, for example, sending, receiving, accepting, storing and archiving emails from other users and other organizations. The email client modules 212 may also provide users the ability to mark emails in the inbox of the user as "read" or "unread" as well as provide the ability to add customized labels to each email. The email client modules 212 may also enable users to share intention objects with one another. The sharing of an intention object may allow other users to simply view the intention object of another user or the sharing of the intention object may be an invitation to attend an event or activity associated with the intention object. When shared with an additional user, all of the content and attributes of the shared intention object may be included in the communication to the additional user.

In some embodiments, the sharing of the intention object is an assignment of an activity or task associated with the intention object to an additional user or group of users. Consistent with this embodiment, an intention object included in an intention object collection 214 corresponding to a first user, when shared with a second user, may automatically be added to the intention object collection 214 corresponding to the second user.

In some embodiments, the task management application 128 may include one or more assignment modules 218, which may analyze the collection of intention objects 214 and assign each intention object to a coarse time window. In some embodiments, the particular coarse time window assigned to each intention object may be based on the temporal attributes of each respective intention object. In some embodiments, the temporal attributes of a particular intention object may include a coarse time window for undertaking an activity defined by the activity attributes of the intention object. In some embodiments, the coarse time window assigned to a particular intention object may be a suggestion for the user to complete the activity during the coarse time window.

For purposes of this disclosure, a "coarse time window" means a time period, time range, time frame, or temporal category that is a subdivision of a particular greater time span, with the subdivision having a coarser granularity than a primary time unit making up the greater time span. For instance where the greater time span is a day, with its primary time unit being an hour, the coarse time windows may, for example, include the periods of a day (e.g., morning, afternoon, and evening). Where the greater time span is a week, with its primary time unit being a day, the coarse time window may, for example, be periods of a week (e.g., work week, and weekend). In cases where the greater time span is a year, with the primary time unit being a month, the coarse time window may, for example, include periods of the year (e.g., first quarter, second quarter, etc.), seasons of the year, or any other type of discrete time period. The granularity of periodization of the coarse time windows may vary between embodiments, and in some embodiments, may be based on user preferences.

The task management applications 128 may also include one or more communication modules (not shown), which may be used for generation and delivery of messages (e.g., suggestions, notifications, reminders) to users of the data exchange platform 102. The communication modules may utilize any one of a number of message delivery networks and platforms to deliver messages to users. For example, the communication modules may deliver push notifications, electronic mail (e-mail), instant message (IM), Short Message Service (SMS), text, facsimile, or voice (e.g., Voice over IP (VoIP)) messages.

Figure 3:
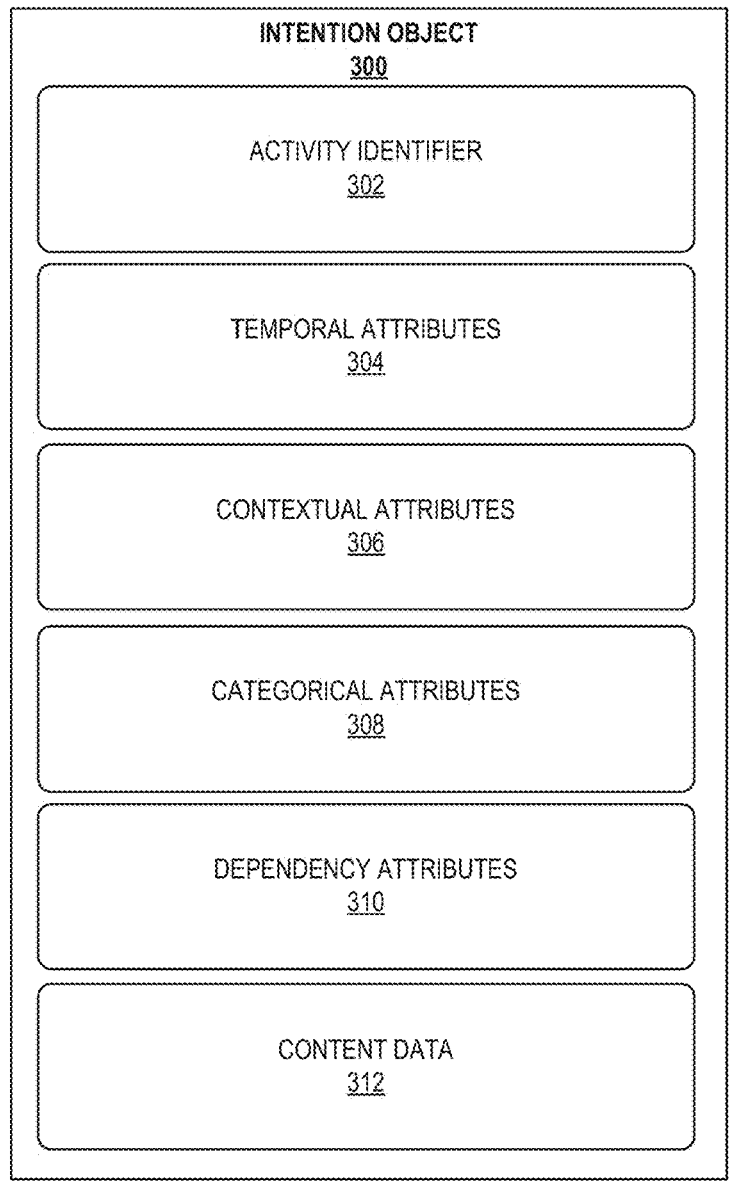
FIG. 3 is a high-level relationship diagram, in accordance with an example embodiment, illustrating various attributes and data elements that are maintained as part of an intention object.

FIG. 3 is a high-level relationship diagram, in accordance with an example embodiment, illustrating various attributes and data elements that are maintained as part of an example intention object 300. Intention object 300 may concurrently reside in the calendar of the user provided by calendar modules 206, an email in the inbox provided by the email client module 212, and in the intention object collection 214.

As illustrated in FIG. 3, the intention object 300 is a data structure comprising an activity identifier 302, a plurality of activity attributes (e.g., temporal attributes 304, contextual attributes 306, categorical attributes 308, dependency attributes 310) and content data 312. The activity identifier 302 may identify the particular activity the user intends to undertake. The activity identifier 302 may be a title, a name, or any other set of words used to refer to the intended activity. The activity may be any action, movement, task or other work to be performed by the user. The activity may be a one-time occurrence or in some embodiments, a recurring activity that is performed at predefined intervals. By way of non-limiting example, the activity may be a work project, a household errand (e.g., house cleaning, grocery shopping, etc.), a phone call to be placed, a meeting or presentation, an email, note or letter to be drafted, or the like.

The plurality of activity attributes may define the intention of the user to undertake the activity identified by the activity identifier 302. The activity identifier may be a title, a name or any other set of words used to refer to the activity. The plurality of activity attributes may include temporal attributes 304, contextual attributes 306, and categorical attributes 308. The temporal attributes 304 define time constraints relating to the activity. The temporal attributes 304 may, for example, include a creation date, a completion date, a start time, an end time, a deadline or due date, a frequency (for reoccurring activities), a duration of time necessary for undertaking an activity, a reminder date or time, a travel time, and an amount of time spent performing the activity. The precision and granularity of each of the temporal attributes 304 may be progressively refined based on user input. For example, a user may specify a time constraint as an exact time (e.g., "at 7:26 a.m."), an approximate time (e.g., "at breakfast"), a time range (e.g., "between 4:00 p.m. and 5:00 p.m."), an exact date (e.g., "on Aug. 16, 2014"), an approximate date (e.g., "in a couple weeks from today"), a date range (e.g., "between Jul. 9, 2013, and Jul. 11, 2013"), a coarse time frame (e.g. "after my noon meeting but before my 3 P.M. meeting"), or a season (e.g., "summer 2013").

The contextual attributes 306 identify at least one context relating to the activity. The context may be the circumstances that form a setting relevant to the undertaking or completion for an activity. The contextual attributes 306 may, for example, include a location, a mental state of the user, a proximity to another user, a mode of transportation, or a particular environmental setting.

The categorical attributes 308 include one or more categories or types of activities. In some embodiments, the category is based on one or more of the temporal attributes. For example, an intention object with an activity that may depend on a relatively long period of time to complete may be classified as a "long term" intention object. In contrast, an intention object with an activity that may require only a relatively short period of time may be classified as a "short term" intention object. In some embodiments, the category may be based on one or more contextual attributes. For example, an intention object with an activity that must be undertaken at the home of the user may be classified as a "household errand."

As illustrated in FIG. 3, the intention object 300 may also include dependency attributes 310. Dependency attributes 310 relate to dependencies of the intention object 300 and on other intention objects or additional users. The intention object 300 may be associated with or depend on one or more additional intention objects. The intention object 300 may depend on the additional intention object such that the activity of the intention object 300 must be undertaken or completed prior to the activity of the additional intention object. In the case of multiple dependencies, the dependency attributes 310 may also provide an indication of the order in which the activities are to be undertaken. In some embodiments, this order is determined based on the relevancy rank calculated by the relevancy ranking module 216. In some embodiments, the intention object 300 may depend on an activity, action, or event that does not correspond to an intention object.

In some embodiments, the dependency attributes 310 of the intention object 300 may also include information related to one or more additional users related to or important for undertaking the activity. In some embodiments, the activity or task may be assigned to the one or more additional users. The dependency attributes 310 may include an identifier of the one or more additional users such as a name, a title, an email address, a phone number, an employee identification number, or any other information that may uniquely identify the one or more users.

As illustrated in FIG. 3, the intention object 300 may also include content data 312. The content data 312 may include one or more content items or files associated with the activity. By way of non-limiting example, the content data 312 may include a link or list of links associated with the intention, an attached file or collection of files, and one or more reminders to undertake the activity. In some embodiments, the content data 312 may be content that is needed for the user to complete the activity. For example, an intention object corresponding to an intention of a user to create a presentation may include a template file for the presentation as part of the content data 312.

Figure 4:
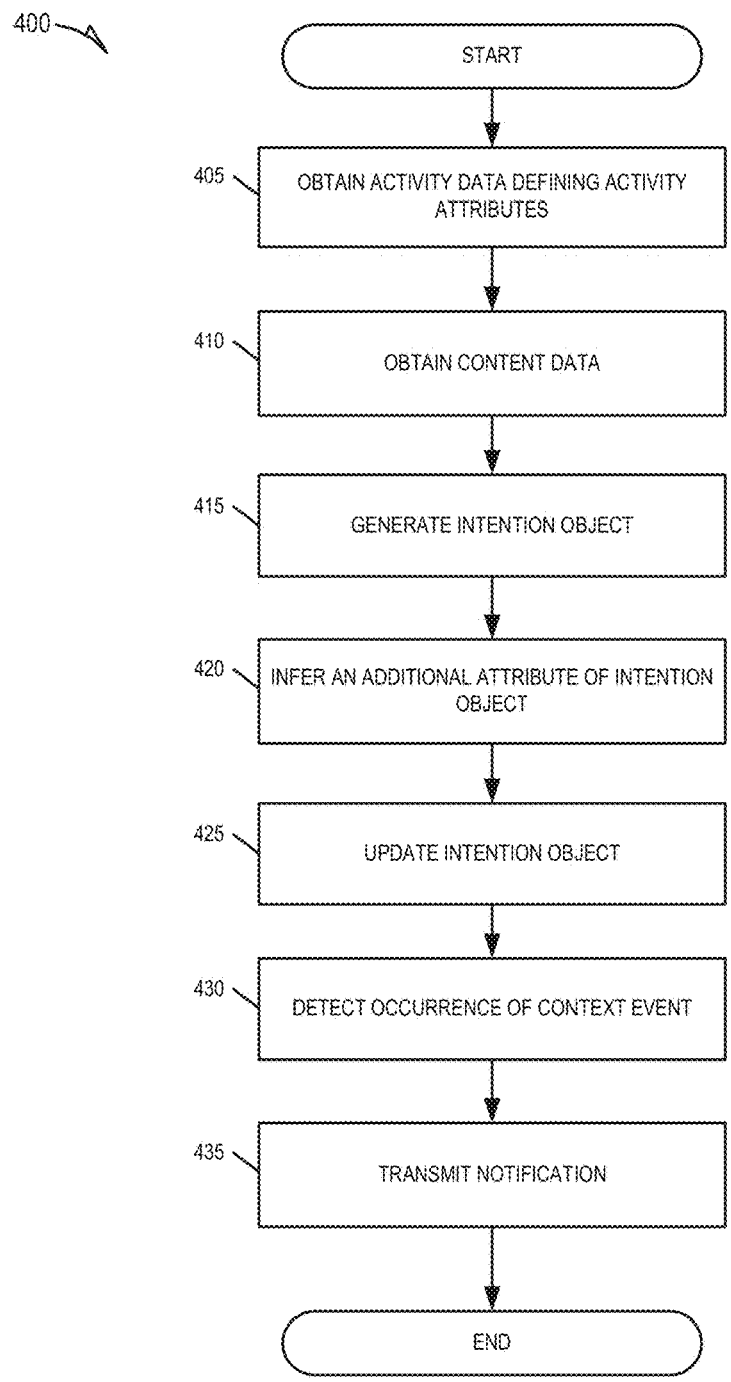
FIG. 4 is a flowchart illustrating an example method for generating an intention object, according to an example embodiment.

FIG. 4 is a flowchart illustrating an example method 400 for generating an intention object, according to an example embodiment. In this example, the method 400 may include operations such as obtaining activity data defining a plurality of activity attributes at operation 405, obtaining content data at operation 410, generating an intention object at operation 415, inferring an additional attribute at operation 420, updating the intention object at operation 425, detecting occurrence of one or more context events at operation 430, and transmitting a notification at operation 435.

At operation 405, activity data defining a plurality of activity attributes of an intention of a user to undertake an activity is obtained. The plurality of activity attributes may include at least one temporal attribute defining a time constraint relating to the intended activity and at least one contextual attribute identifying a context relating to the intended activity.

In some embodiments, the activity data defining the plurality of activity attributes may be obtained from a user via a user interface provided by the interface modules 114. In other embodiments, the obtaining of the activity data comprises obtaining a communication (e.g., a calendar event, an email, a text message, an instant message, a phone call, etc.) related to the activity and parsing the communication to determine the one or more activity attributes.

At operation 410, content data is obtained. The content data may define one or more content items related to or required for the undertaking of the activity. In some embodiments, the content data may be obtained from a user. In embodiments where the one or more attributes are determined from a communication related to the activity, the communication may be automatically included as part of the content data.

At operation 415, an intention object is generated based on the plurality of activity attributes. The generated intention object may comprise a data structure including the plurality of activity attributes and the one or more content items.

At operation 420, an additional attribute of the intention object is inferred based on the plurality of activity attributes. In some embodiments, the additional attribute is a categorical attribute. In some embodiments, the inferring of the additional attribute is based on a physical location of the user. For example, if the contextual attributes of a particular intention object indicate that the activity is to be undertaken at a first location, but the user is in a second location, the travel time for the activity may be inferred based on the location of the user.

In some embodiments, the inferring of the additional attribute is based on a particular client device being used by the user. For example, users with multiple devices may have certain devices for personal use and other devices for business use. If a user initiates the generation of an intention object from a device that is for personal use, it may be inferred that the intention object is in the category of "household errands." Thus, a categorical attribute may be inferred.

At operation 425, the intention object is updated to include the additional attribute. At operation 430, a context event is detected. The context event relates to one or more of the contextual attributes. For example, the contextual attributes may specify a particular location and the GPS functionality of the client device may be used to determine the occurrence of a context event based on the current location of the user being at a location specified by the contextual attributes. In another example, the GPS functionality of multiple client devices may be used to determine the occurrence of a context event based on the user being proximate to another user.

In response to detecting the occurrence of the context, a notification is transmitted to the user at operation 435. Depending on the activity attributes, the notification may be a reminder to the user to undertake the activity. In other embodiments, the notification may be merely a suggestion that the user undertake the activity.

Figure 5:
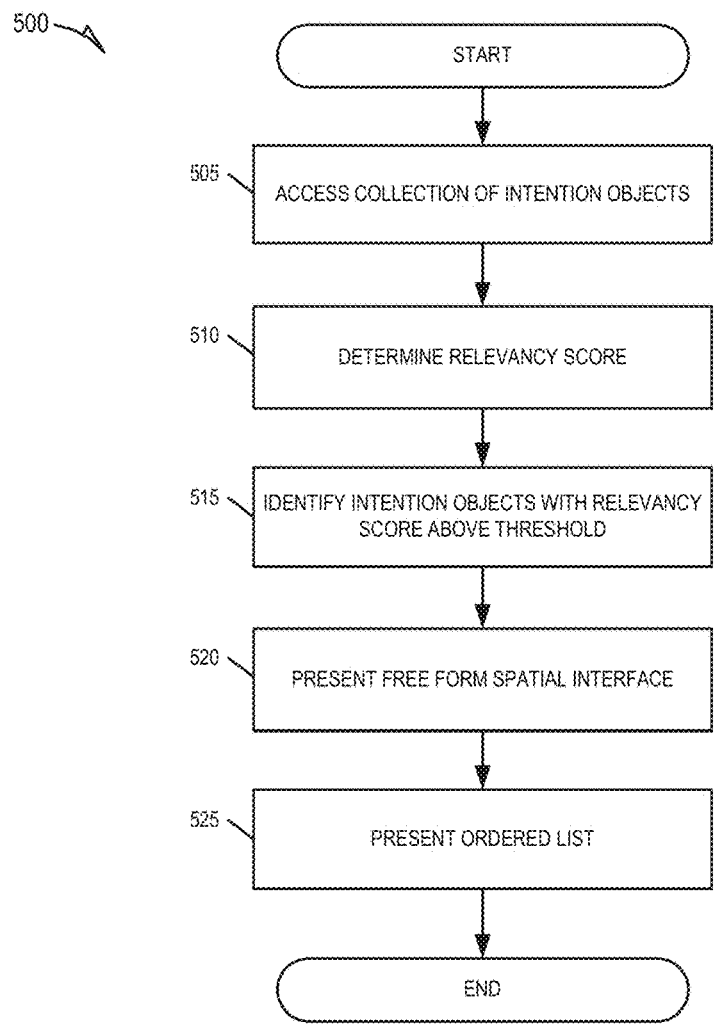
FIG. 5 is a flowchart illustrating an example method for selectively presenting a collection of intention objects to a user, according to an example embodiment.

FIG. 5 is a flowchart illustrating an example method 500 for selectively presenting a collection of intention objects to a user, according to an example embodiment. In this example, the method 500 may include operations such as accessing a collection of intention objects at operation 505, determining a relevancy rank at operation 510, identifying intention objects with a relevancy rank above a threshold at operation 515, presenting a free form spatial interface at operation 520, and presenting the collection of intention objects in an ordered list at operation 525.

At operation 505, a collection of intention objects belonging to a user is accessed. Each of the intention objects may comprise a data structure including a plurality of activity attributes. The plurality of activity attributes may include one or more temporal attributes and one or more contextual attributes. In some embodiments, the one or more contextual attributes may identify a location for undertaking the activity.

At operation 510, a relevancy rank for each of the intention objects in the collection of intention objects is calculated. The relevancy rank may indicate a suggested order in which the user undertake each respective activity. The relevancy rank may be determined based on the respective activity attributes of each of the intention objects.

At operation 515, one or more above-threshold intention objects with a relevancy rank above a predefined threshold are identified. The predefined threshold may be dynamically set by a user, or in some embodiments, the predefined threshold may be a default value.

At operation 520, graphical representations of the one or more identified intention objects are generated and presented to the user in a free form spatial interface. The presentation of each intention object may include one more executable user interface elements allowing the user to take one or more actions associated with respect to each intention object. Each of the intention objects presented to the user may be placed in an active state, while the remaining intention objects of the collection of intention objects are placed in an inactive state. Consequently, only the intention objects that are the most relevant to the user are presented to the user.

The method 500 may optional include the operation 525, in which the user is presented with the identified one or more intention objects in an ordered list. The order of the list may be determined by the relevancy rank of each of the one or more identified intention objects.

Figure 6:
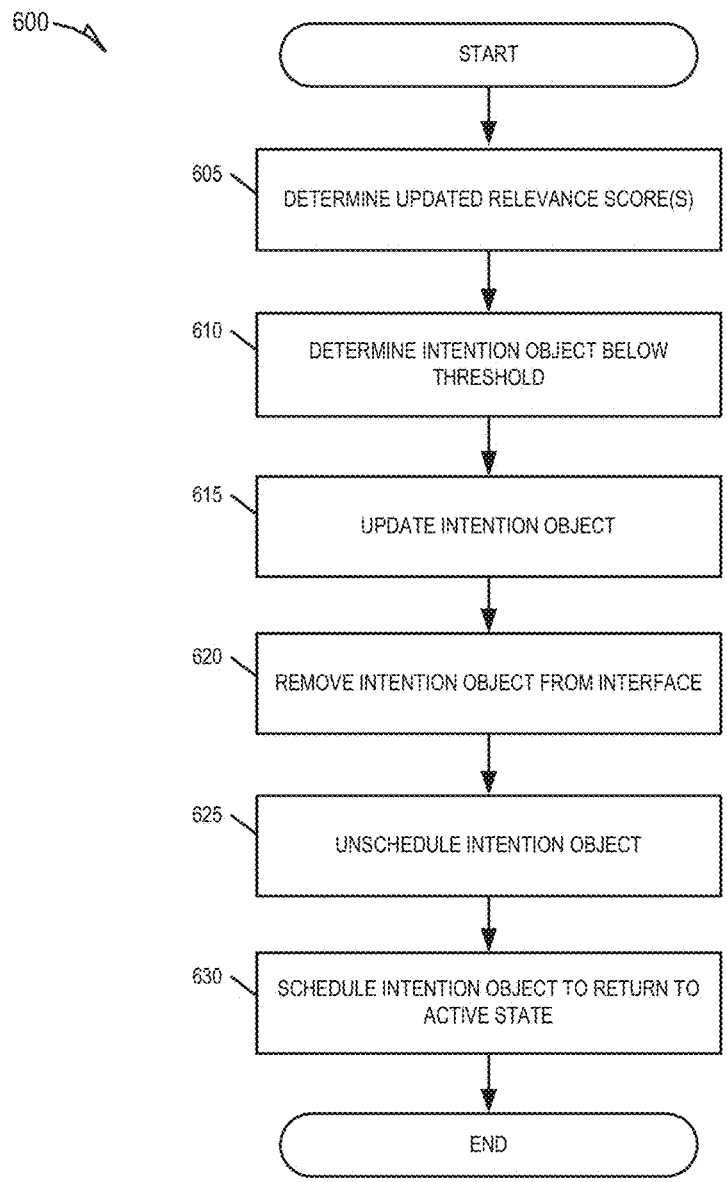
FIG. 6 is a flowchart illustrating an example method for updating a collection of intention objects, according to an example embodiment.

FIG. 6 is a flowchart illustrating an example method 600 for updating a collection of intention objects, according to an example embodiment. The method 600 may begin subsequent to the termination of method 500. In this example, the method 600 may include operations such as determining updated relevancy ranks at operation 605, determining an intention object with a relevancy rank below a threshold at operation 610, updating the intention object at operation 615, removing the intention object from the freeform spatial canvas at operation 620, unscheduling the intention object at operation 625, and scheduling the intention object to be returned to the active state at operation 630.

At operation 605, an updated relevancy rank is determined for each of the intention objects of the collection of intention objects. The determining of the updated relevancy ranks may occur automatically at predefined intervals without any user intervention. In some embodiments, the updated relevancy ranks may be determined in response to a change to the collection of intention objects (e.g., intention objects added or removed). In some embodiments, the updated relevancy ranks are determined in response to a change in location or other circumstances that may form the setting for undertaking one or more respective activities of the collection of intention objects.

At operation 610, the updated relevancy rank for a particular intention object is determined to be below a predefined threshold. The predefined threshold may be the same predefined threshold discussed above with respect to operation 515. In response to the relevancy rank of the particular intention object being below the predefined threshold, the status of the particular intention object is updated to be in an inactive state at operation 615. In response to the particular intention object being inactive, the graphical representation of the particular intention object is removed from the free form spatial interface at operation 620 and unscheduled from the calendar of the user at operation 625.

At operation 630, the particular intention object is scheduled to be returned to the active state. The intention object may be scheduled to be returned to the active state in response to and in accordance with user input.

Figure 7:
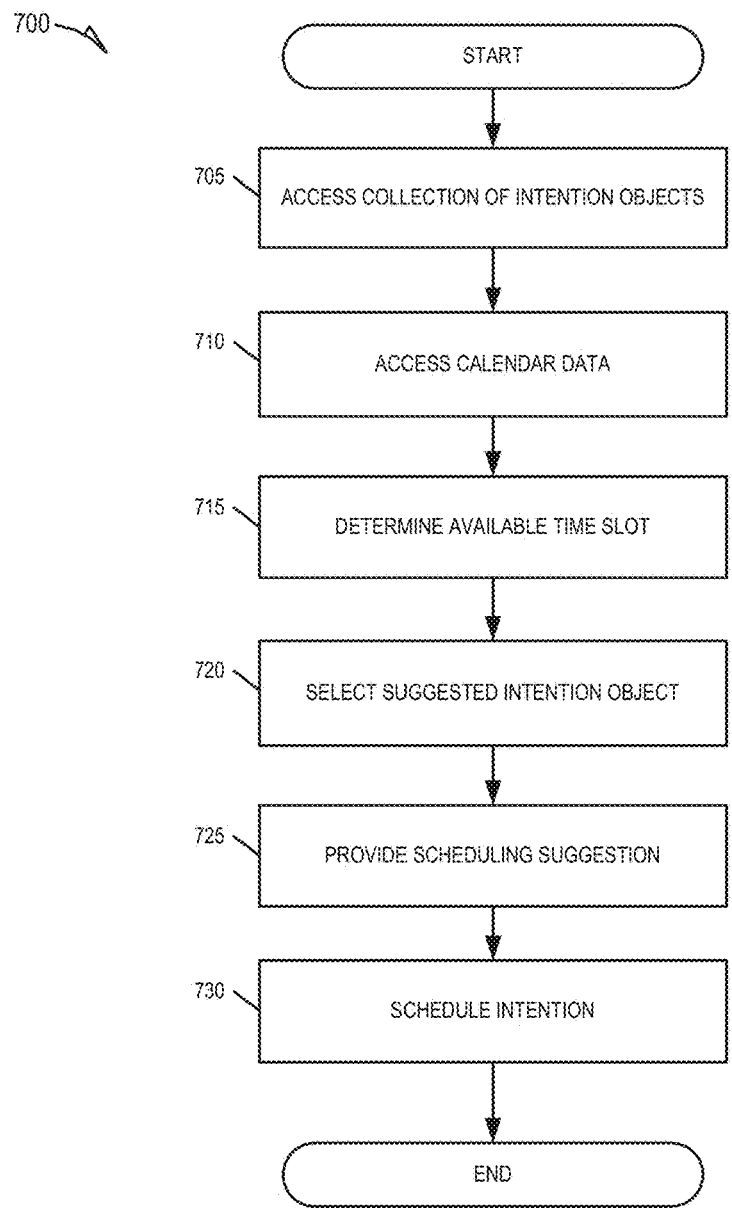
FIG. 7 is a flowchart illustrating an example method for providing scheduling suggestions to a user, according to an example embodiment.

FIG. 7 is a flowchart illustrating an example method 700 for providing scheduling suggestions to a user, according to an example embodiment. In this example, the method 700 may include operations such as accessing a set of intention objects at operation 705, accessing calendar data at operation 710, determining an available time slot at operation 715, selecting a suggested intention object at operation 720, providing a scheduling suggestion at operation 725, and scheduling the intention at operation 730.

At operation 705, a collection of intention objects belonging to a user is accessed. At operation 710, calendar data from a calendar of the user is accessed. In some embodiments, the calendar data may be retrieved from one or more third party calendar services (e.g., third party application 124). In some embodiments, the calendar data may correspond to one or more calendars of the user provided by calendar module 206.

At operation 715, the calendar data is analyzed to determine an available time slot in the user's schedule. At operation 720, a suggested intention object is selected from the collection of intention objects. The suggested intention object may be selected based on a combination of the length of the available time slot, the plurality of activity attributes of the intention object, and the relevancy rank of the intention object. For example, at operation 715 a fifteen minute available time slot in the schedule of the user may be identified and at operation 720 a particular intention object may be selected as the suggested intention object based on the particular intention object having a temporal attribute indicating that the corresponding activity may take fifteen minutes to complete. In another example, the intention object with the greatest relevancy ranking may be selected as the suggested intention object.

At operation 725, a scheduling suggestion is generated and provided to the user. The scheduling suggestion may include a suggestion to schedule the activity corresponding to the suggested intention object. In some embodiments, the scheduling suggestion may be automatically transmitted to the client device of the user as a notification without the need for an application to be executing. In other embodiments, the scheduling suggestion is provided to the user upon opening the relevant application (e.g., task management application 128). The scheduling suggestion may also provide the user with an ability to quickly schedule the activity of the intention object. Depending on the client device, the activity may be scheduled through a single click, keystroke, or touch screen gesture. In response to receiving such user input, the activity may be scheduled on the calendar of the user at operation 730.

Figure 8:
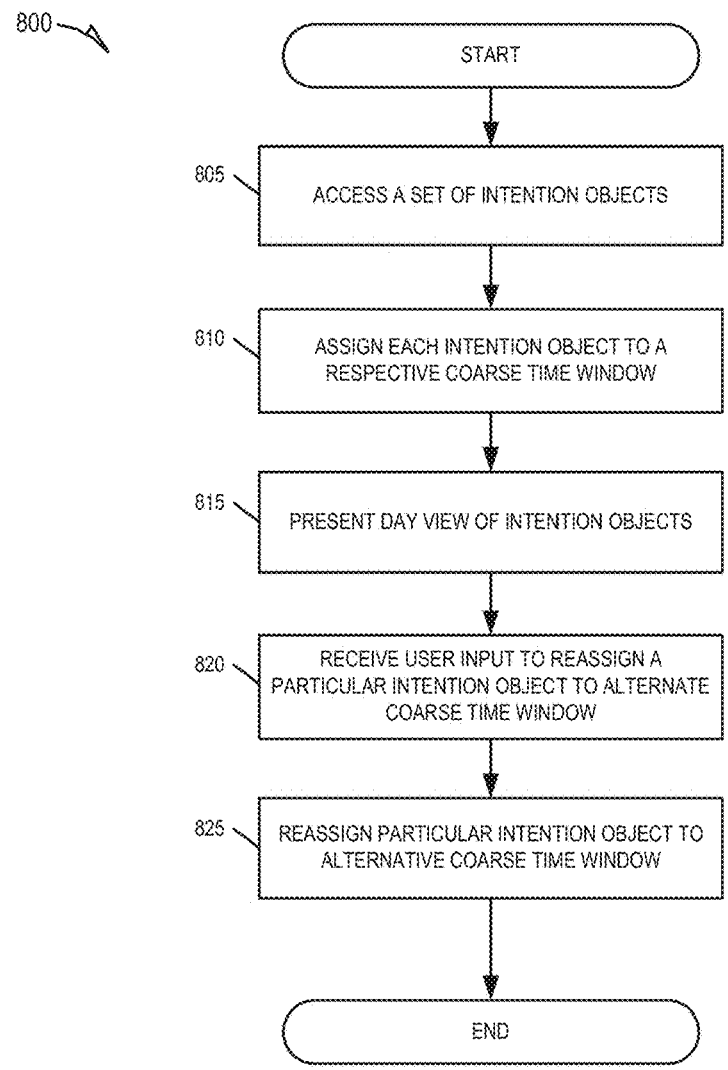
FIG. 8 is a flowchart illustrating an example method for presenting a set of intention objects in a day view, according to an example embodiment.

FIG. 8 is a flowchart illustrating an example method 800 for presenting a set of intention objects, according to an example embodiment. In this example, the method 800 may include operations such as accessing a set of intention objects at operation 805, assigning each intention object to a respective coarse time window at operation 810, presenting a day view of the set of intention objects at operation 815, receiving user input to reassign a particular intention object at operation 820, and reassigning the particular intention object at operation 825.

At operation 805, a set of intention objects is accessed. In some embodiments, the set of intention objects may be a collection of intention objects belonging to a particular user. At operation 810, each intention object of the set of intention objects is assigned to a coarse time window. Multiple intention objects may be assigned to a common coarse time window. The number of coarse time windows may be predetermined or established based on user preferences. In some embodiments, the coarse time windows may include morning, afternoon, and evening. Each intention object may be assigned to a coarse time window based on the respective temporal attributes of the intention object. For example, an intention object having a temporal attribute indicating a start time of 9:00 P.M. may be assigned to the "evening" coarse time window. In another example, an intention object having a start time of 8:00 A.M. may be assigned to the coarse time window "before work," assuming that the intention object corresponds to a user with a work schedule that begins after 8:00 A.M.

At operation 815, a day view of at least a portion of the set of intention objects is presented to the user. The day view includes intention objects associated with a particular day. The association may be based on the temporal attributes of each respective intention object. For example, each intention object having a start date of Aug. 23, 2013, may be presented in the day view for the day of Aug. 23, 2013. The day view may be arranged according to two or more coarse time windows. The two or more coarse time windows correspond to the coarse time windows assigned to the set of intention objects at operation 810. Example embodiments of the day view are discussed below in reference to FIG. 16A-16D.

In some embodiments, the method 820 may include receiving user input to reassign a particular intention object included in the day view to an alternate coarse time window, at operation 820. Depending on the client device being employed by the user, the user input may be a mouse click, a keystroke, or a touch screen gesture. At operation 825, the particular intention object is reassigned to the alternate coarse time window in response to the user input. For example, a user may select a particular intention object initially assigned to the "Morning" time window. The user may quickly reassign the selected intention object to the "evening" time window by dragging the intention object into the "Evening" time window.

Figure 9:
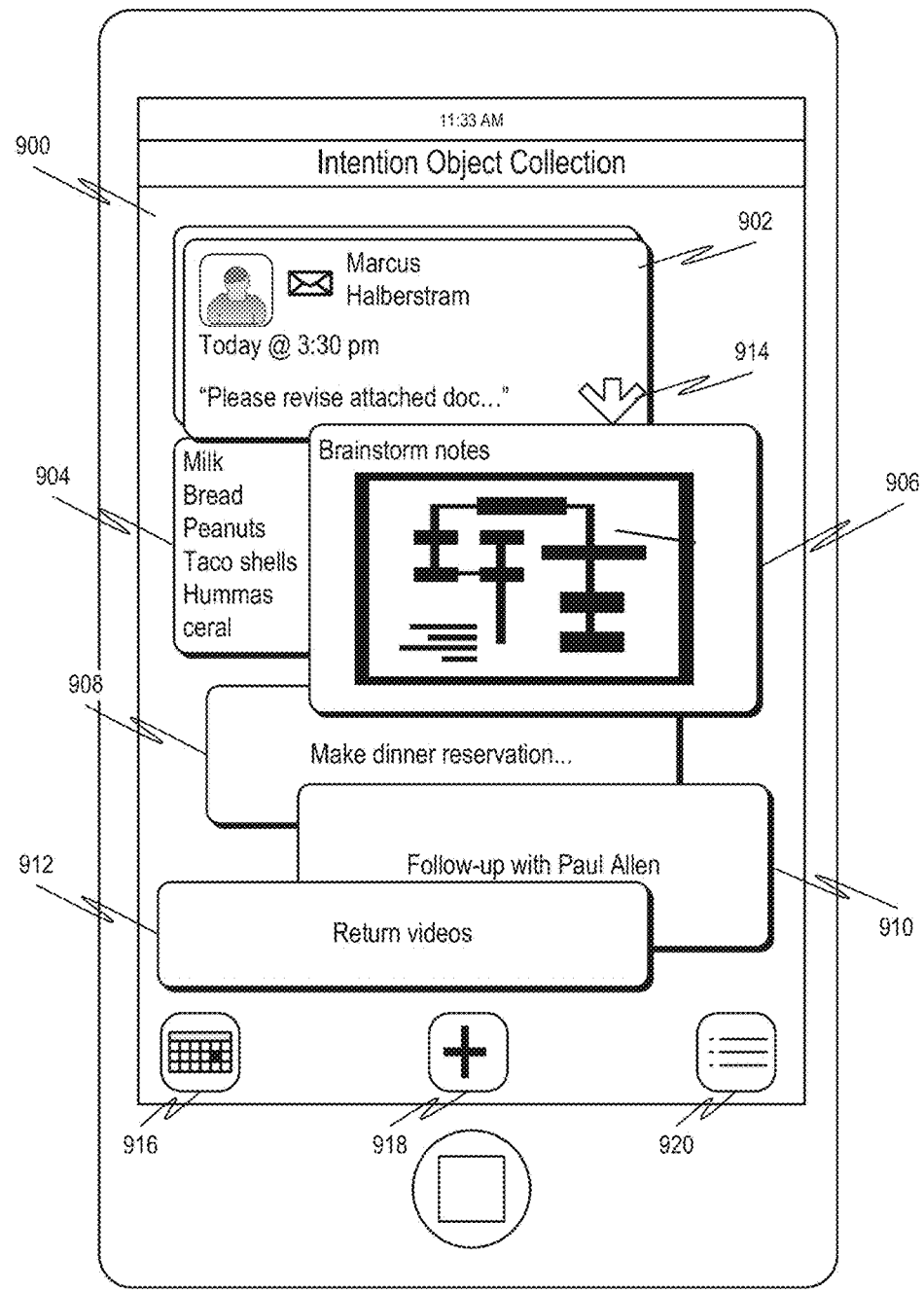
FIG. 9 is an interface diagram illustrating an example free form spatial user interface including a graphical representation of a collection of intention objects, according to some embodiments.

FIG. 9 is an interface diagram illustrating an example free form spatial interface 900 including a graphical representation of a collection of intention objects, according to some embodiments. As illustrated in FIG. 9, graphical representation of the collection of intention objects may include graphical representations of intention objects 902-912. A user may be able to customize the appearance of the graphical representation of each intention object 902-912 by specifying the size, shape, font and color of each of the intention objects 902-912. A user may drag and position each of the intention objects 902-912 anywhere within the free form spatial interface 900. In some embodiments, dragging and dropping an intention object to a particular location or region with the free form spatial interface 900 may cause a particular action to taken with respect to the intention object. For example, a user dragging and dropping intention object 902 to the bottom right quadrant of free form spatial interface 900 may automatically cause a reminder to be set for intention object 902. In another example, a user dragging and dropping intention object 904 to the top right quadrant of free form spatial interface 900 may automatically cause the intention object 904 to be scheduled on the calendar of the user.

In some embodiments, a user may be able to quickly associate two or more intention objects by dragging an intention object over the top of another intention object or group of intention objects. Indicator 914 signifies that intention object 902 contains multiple dependent or associated intention objects. Selection of indicator 914 may cause the display of the one or more dependent intention objects. Further details of this operation are discussed below in reference to FIG. 9. For purposes of this specification, "selection" of a button or other user interface element refers to the receiving of a user input indicating the selection of the button or other user interface. Depending on the client device 106 being used, the user input may be a mouse click or gesture, a keyboard stroke, a voice command, a single gesture on a touch enabled surface or display, accelerometer input, optical recognition input or the like.

As illustrated in FIG. 9, the free form spatial interface 900 may also include buttons 916, 918, and 920 to provide additional functionality. For example, selection of button 916 causes a calendar of the user to be displayed. Further details of this feature are discussed below in reference to FIG. 10. The button 918 allows users to create and add additional intention objects to the intention object collection. Selection of the button 918 may cause an additional interface (not shown) to be displayed. This additional interface may allow a user to input an activity identifier and one or more attributes defining an intention of the user to undertake the activity. Selection of button 920 may cause an alternative display or presentation of the collection (e.g., an ordered list). Further details of this feature are discussed below in reference to FIG. 11.

Figure 10:
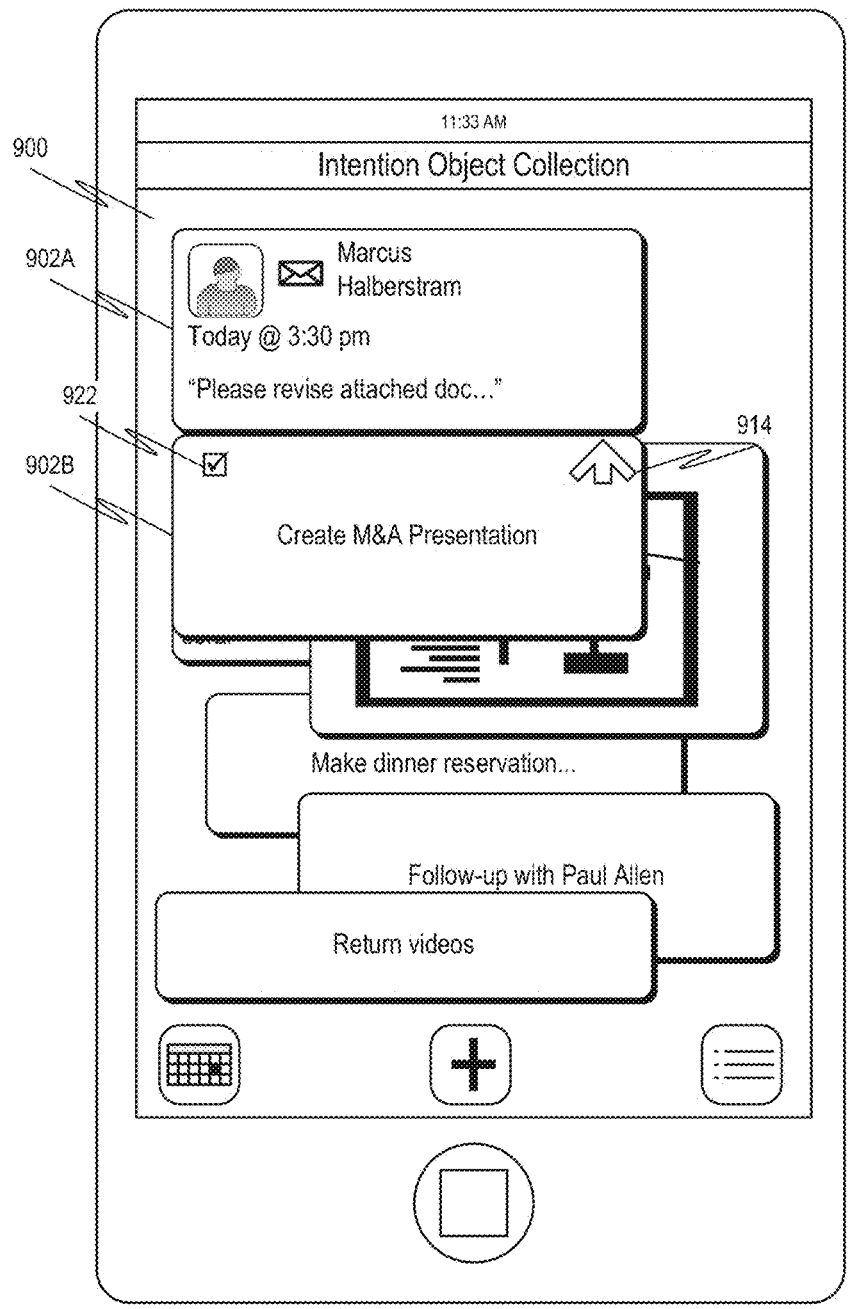
FIG. 10 is an interface diagram illustrating an example dependent intention object, according to some embodiments.

FIG. 10 is an interface diagram illustrating the example free form spatial interface 900 with an example graphical representation of a dependent intention object, according to some embodiments. FIG. 10 illustrates the result of the selection of indicator 914 discussed above in reference to FIG. 9. Intention objects 902A and 902B comprise the intention object 902 displayed in FIG. 9. As illustrated, intention object 902A is dependent upon intention object 902B. Intention object 902A depends on intention object 902B such that the activity corresponding to intention object 902B is to be completed prior to undertaking the activity corresponding to intention object 902A. The intention object 902B also includes indicator 922, which indicates to the user that the activity corresponding to intention object 902B has been completed.

Figure 11:
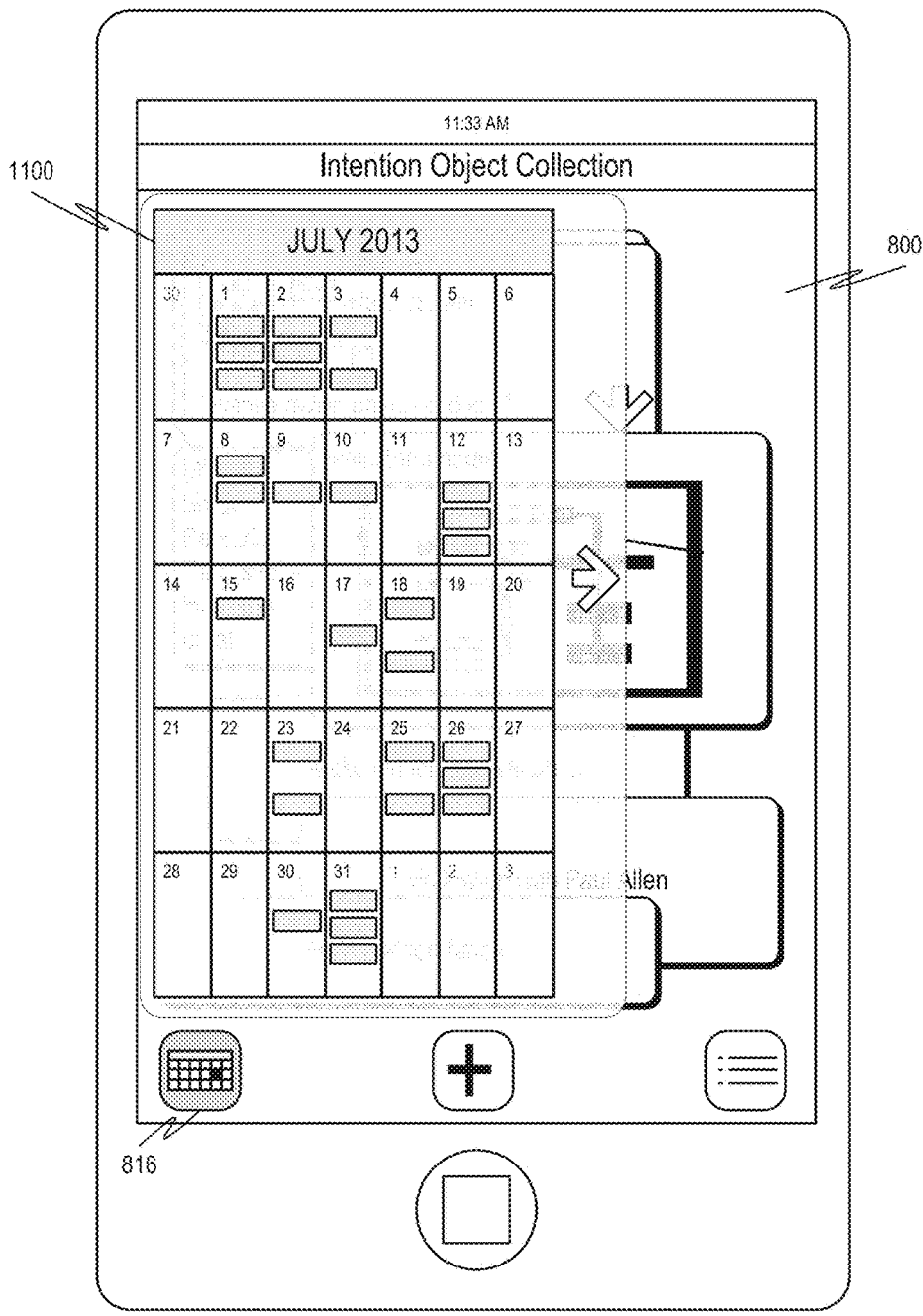
FIG. 11 is an interface diagram illustrating an example collection of intention objects and a calendar, according to some embodiments.

FIG. 11 is an interface diagram illustrating the example free form spatial interface 900 with an example graphical representation of a collection of intention objects and an example calendar 1100, according to some embodiments. The calendar 1100 may be the calendar maintained by the calendar module 206, and may provide the user with all the functionality described herein with respect to the calendar module 206. The calendar 1100 may be displayed to a user in response to selection of button 916 illustrated in FIG. 9. As illustrated in FIG. 11, the calendar 1100 may be presented to the user in a translucent interface overlaid on the free form spatial interface 900. In other embodiments, the calendar 1100 may be presented in an interface that is separate and distinct from the free form spatial interface 900.

Specific dates on the calendar 1100 may also include one or more indicators of calendar events scheduled on those dates and may provide some indication as to the time at which these events are scheduled. In some embodiments, one or more calendar events may correspond to one or more intention objects. These scheduled intention objects may reside on both the calendar 1100 and the free form spatial interface 900.

Figure 12:
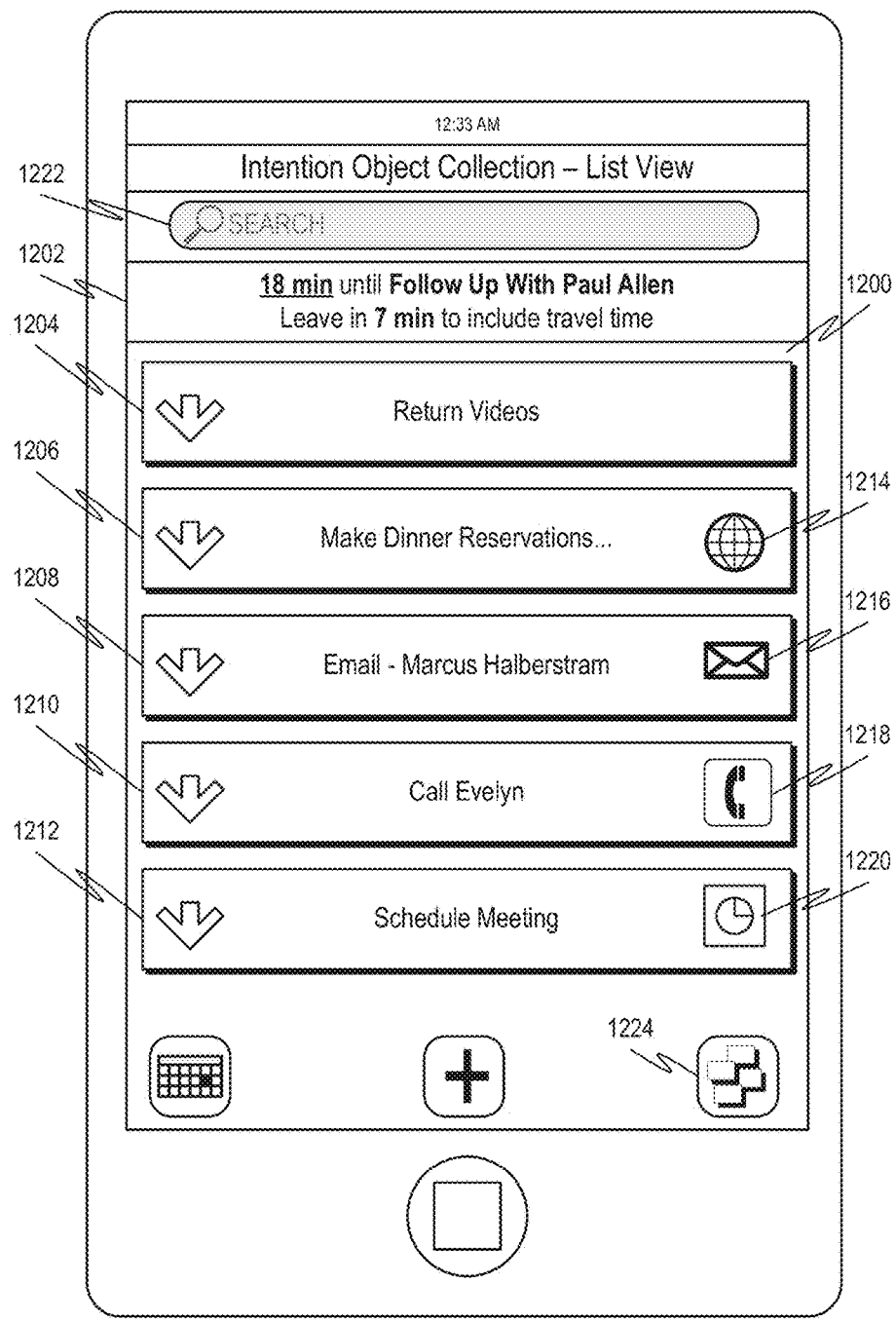
FIG. 12 is an interface diagram illustrating an example collection of intention objects presented in an ordered list, according to some embodiments.

FIG. 12 is an interface diagram illustrating an example collection of intention objects presented as an ordered list 1200, according to some embodiments. The ordered list 1200 may include intention objects 1202-1212. The order in which the intention objects 1202-1212 are presented may be based on the relevancy ranking of each intention object calculated by the relevancy ranking modules 216. The intention object with the highest relevancy ranking (e.g., intention object 1202) may be presented at the top of the ordered list 1200, with each subsequent intention object having the next highest relative relevancy ranking. The intention object with the highest relevancy ranking (e.g., intention object 1202) may be presented as a reminder or notification and may include additional information such as information related to a start time or date, a location, a travel time, additional users related to the activity, and the like.

As illustrated in FIG. 12, the presentation of each of the intention objects 1202-1212 may also include one or more executable action items 1214-1220, respectively. Depending on the activity associated with the intention, a number of different executable action items 1214-1220 may be provided. In some embodiments, the particular executable action items 1214-1220 that are provided with a particular intention object are based on the one or more categorical attributes 308 of the particular intention objects.

Executable action items 1214-1220 provide the user with one or more actions to undertake or complete the activities associated with each intention object. For example, selection of executable action item 1214 may cause the client device 106 of the user to open a browser application and direct the user to a website that may enable the user to undertake the activity, which in this case is making dinner reservations. Selection of executable action item 1216 may allow a user to compose an email to the intended recipient identified by the dependency attributes of intention object 1208. This email functionality may be provided by the email client module 212 or by a third party application 124. Selection of executable action item 1218 may allow a user to place a phone call to the intended recipient identified by the dependency attributes of intention object 1210. Selection of executable action item 1120 may allow a user to create a meeting request.

As illustrated in FIG. 11, the interface may also include search bar 1222 and button 1224. The search bar 1222 may allow users to enter keyword based queries to search for a particular intention object or a group of intention objects that are part of the intention object collection of the user. As with button 920, button 1224 may allow users to toggle between various views of the intention object collection 214 (e.g., free form spatial interface 900 and ordered list 1200).

Figure 13:
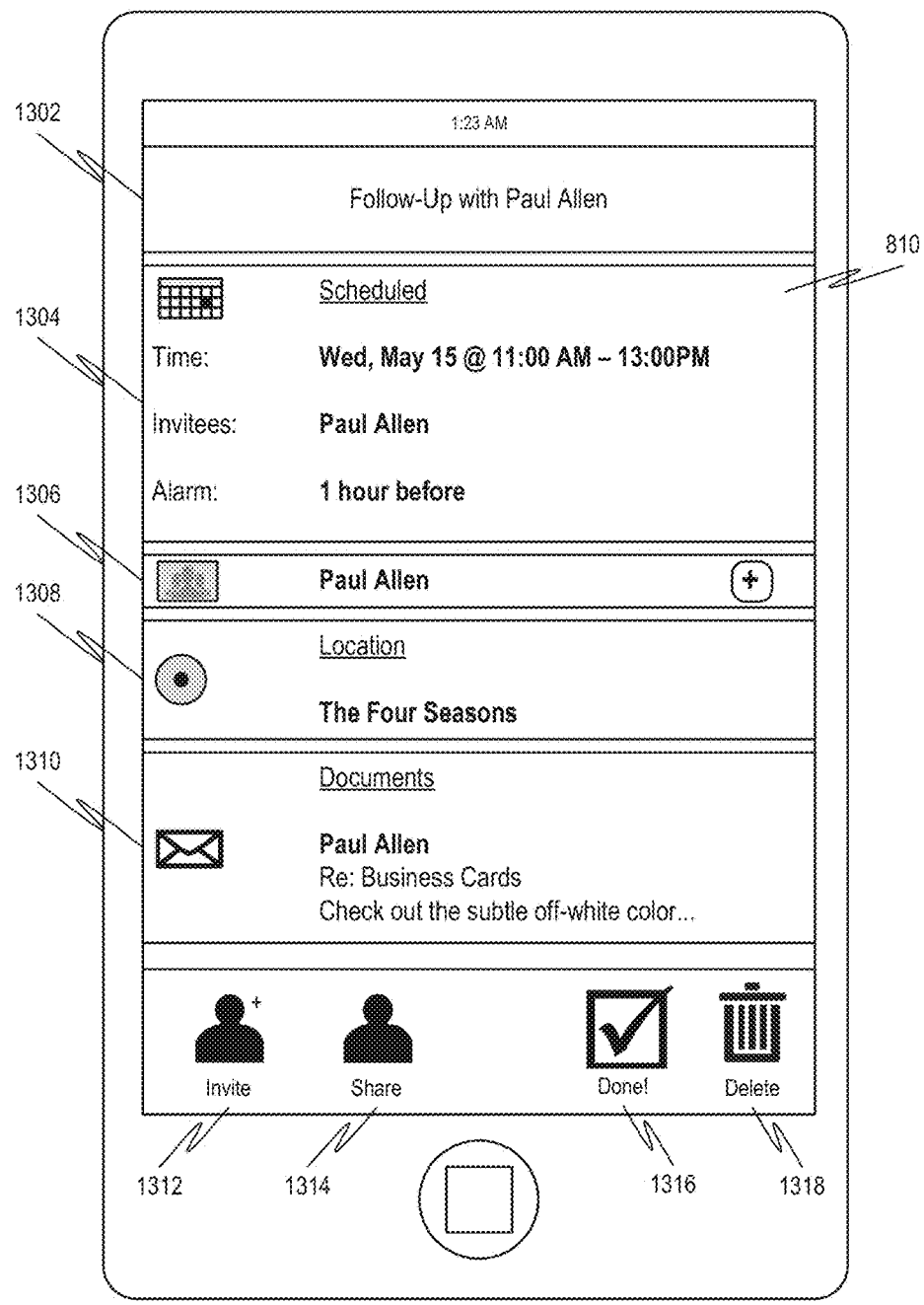
FIG. 13 is an interface diagram illustrating a portion of a detailed view of an example scheduled intention object, according to some embodiments.

FIG. 13 is an interface diagram illustrating a portion of a detailed view of an example scheduled intention object 910, according to some embodiments. The detailed view of intention object 910 may include activity identifier 1302, scheduling data field 1304, dependency data field 1306, location data field 1308, content data field 1310, and buttons 1312-1318. The activity identifier 1302 identifies the activity associated with intention object 910. Intention objects, such as intention object 910, that have been scheduled on one or more of the calendars provided by calendar modules 206 may include scheduling data field 1304. The scheduling data field 1304 may include information related to one or more attributes of the intention object 910. To this end, the scheduling data field 1304 may, by way of non-limiting example, include information such as a scheduled date or time, other invitees or attendees, and one or more reminders. From the detailed view, the user may edit any information therein. The detailed view of an intention object 910 may also provide the user an ability to set a reminder of the intention object 910 with a single touch gesture or drag and drop action.

The dependency data field 1306 relates to one or more dependency attributes 310 of intention object 910 and may identify one or more additional users or additional intention objects 300 that are associated with or depend on intention object 910. The location data field 1308 relates to one or more contextual attributes 306 of intention object 910 and may identify a location associated with the activity identified by the activity identifier 1302. The content data field 1310 relates to the content data 312 of intention object 910 and may include one or more content items or files associated with the activity.

The button 1312, when selected, may provide the user an ability to invite one or more additional users to the scheduled activity. The button 1314, when selected, may allow a user to simply share the intention object 910 with one or more other users. This type of communication functionality of the buttons 1312 and 1314 may be provided by the email client modules 212. The button 1316, when selected, allows a user to mark the intention object 910 as complete. In some embodiments, marking an intention object as complete causes the intention object to be removed from the intention object collection and may cause the execution of method 600. The button 1318, when selected, causes intention object 910 to be deleted and removed from the collection of intention objects.

Figure 14:
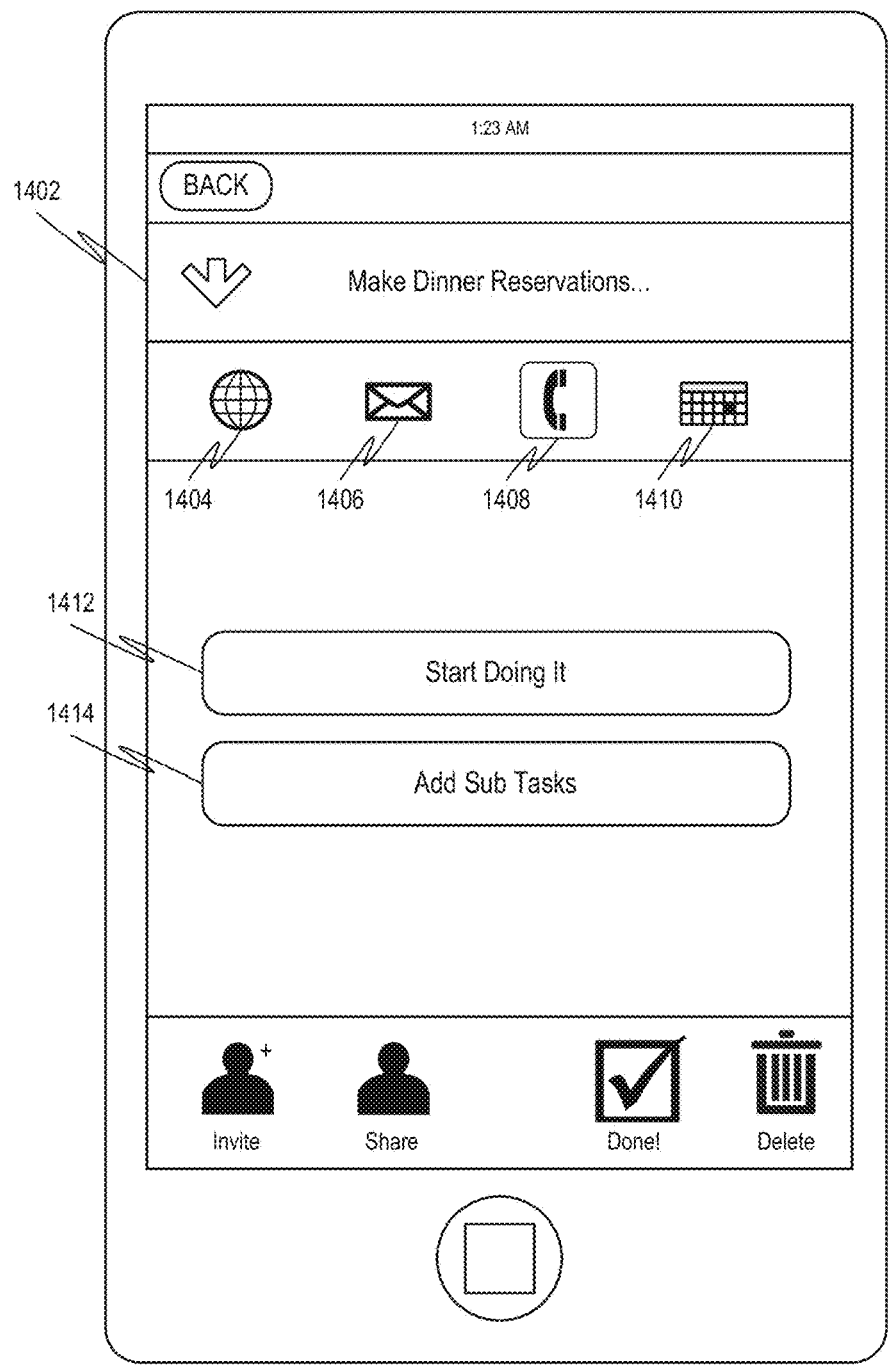
FIG. 14 is an interface diagram illustrating a detailed view of an example unscheduled intention object, according to some embodiments.

FIG. 14 is an interface diagram illustrating a detailed view of an example unscheduled intention object 908, according to some embodiments. The detailed view of intention object 908 may include activity identifier 1402, executable actions 1404-1410, and buttons 1412 and 1414. The activity identifier 1402 identifies the activity associated with intention object 908.

Each of the executable actions 1404-1410 may allow a user to take one or more actions with respect to the intention object 908 regardless of whether the intention object 908 resides in a calendar event, an email, or the intention object collection 214. For example, selection of the button for action 1404 may cause the client device 106 of the user to open a browser application and direct the user to a website related to the activity identified by activity identifier 1402. The button 1406 may allow a user to compose an email related to the activity identified by activity identifier 1402. This email functionality may be provided by the email client module 212 or by a third party application 124. Similarly, the button 1408 may allow a user to place a phone call related to the activity identified by activity identifier 1402. The button 1410 may allow a user to schedule the activity on one or more calendars of the user provided by the calendar modules 206.

Although the detailed view of intention object 908 is illustrated in FIG. 13 to include only executable actions 1404-1410, it should be appreciated that with other intention objects, and in other embodiments, one or more executable actions may be omitted and one or more additional executable actions may also be included.

Figure 15:
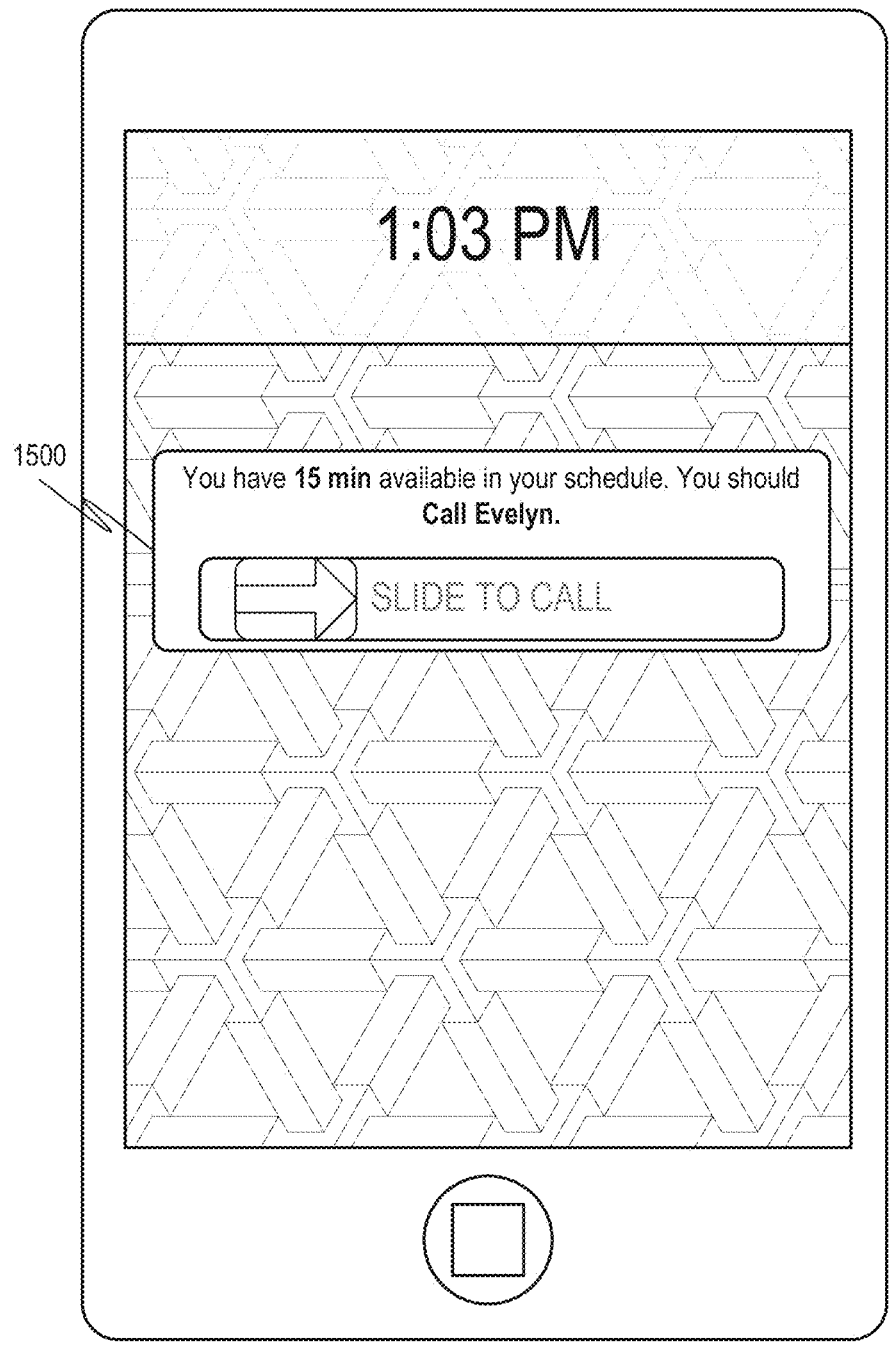
FIG. 15 is an interface diagram illustrating an example scheduling suggestion, according to some embodiments.

FIG. 15 is an interface diagram illustrating an example scheduling suggestion 1500, according to some embodiments. As illustrated in FIG. 1500, the suggestion may be provided to the user as a push notification without the need for the task management application 128 to be executing on the client device 106. In other embodiments, the suggestion 1500 may be provided to the user upon opening an instance of the application 128.

The suggestion 1500 may identify the pertinent activity and may provide additional information related to one or more attributes of the associated intention object (e.g., intention object 1210). In some embodiments, the suggestion 1500 may be provided to the user in accordance with the operations discussed in reference to method 700. In other embodiments, the suggestion 1500 may be provided to the user in response to detecting an occurrence of a context event related to the contextual attributes of the intention object. For example, the user may be provided the suggestion 1500 in response to the user moving to a particular location as indicated by geolocation data provided by the client device 106 of the user. In other embodiments, the suggestion 1500 may be provided to the user based on the user's browsing preferences.

As illustrated in FIG. 15, the suggestion 1500 provides the user with an ability to immediately undertake the activity with a single input gesture. In other embodiments, the suggestion 1500 may simply allow a user to schedule the activity on one or more calendars of the user.

Figure 16A:
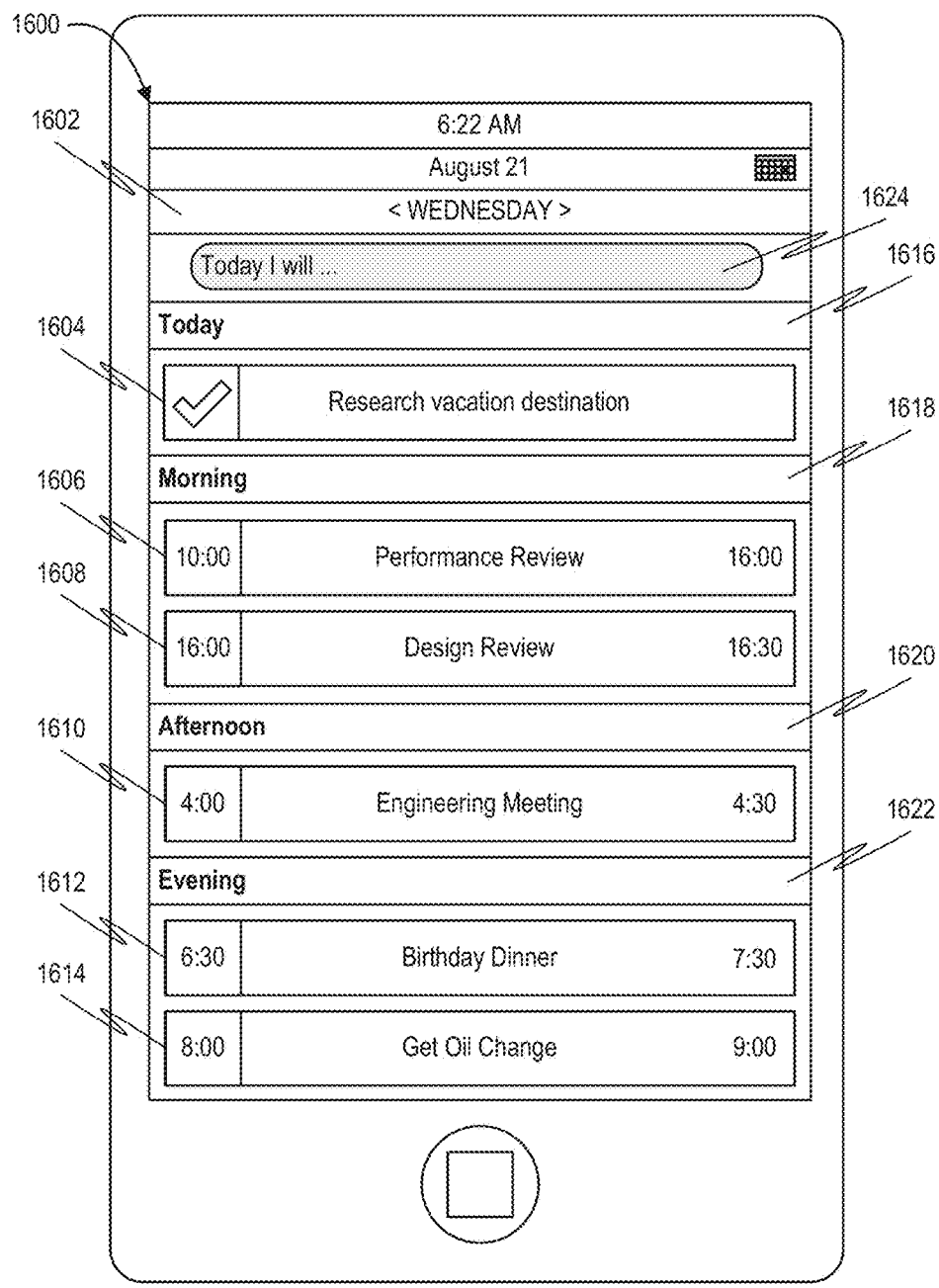
FIG. 16A is an interface diagram illustrating a day view of a collection of intention objects, according to some embodiments.

FIG. 16A is an interface diagram illustrating a day view 1600 of a collection of intention objects, according to some embodiments. As illustrated in FIG. 16A, the day view 1600 may include an indication of a date 1602 corresponding to the day view. The day view 1600 may include a graphical representation of intention objects 1604-1614. Each of the intention objects 1604-1614 share a temporal association (e.g., start date, due date, etc.) with the date 1602 as defined by the respective temporal attributes of each intention object 1604-1614. The graphical representation of each of the intention objects 1604-1614 may include additional information related to the undertaking of each respective activity (e.g., a start time, end time, duration, due date, etc.). A user may navigate through the day view 1600 by scrolling up or down in the interface.

As illustrated in FIG. 16A, the layout and spatial arrangement of the elements of the day view 1600 may be arranged according to coarse time windows 1616-1622. To this end, each of the intention objects 1604-1614 may be assigned to one of the coarse time windows 1616-1622 based on the activity attributes of each of the respective intention objects 1604-1614. The day view 1600 may also include intention prompt 1624, which may allow a user to create a new intention object 300. The new intention object may be assigned to the appropriate coarse time window and accordingly included in the day view 1600. The intention prompt 1624 may be updated in response to user navigation of the day view 1600. More details of intention prompt 1624 are discussed below in reference to FIG. 16B-16D.

Figure 16B:
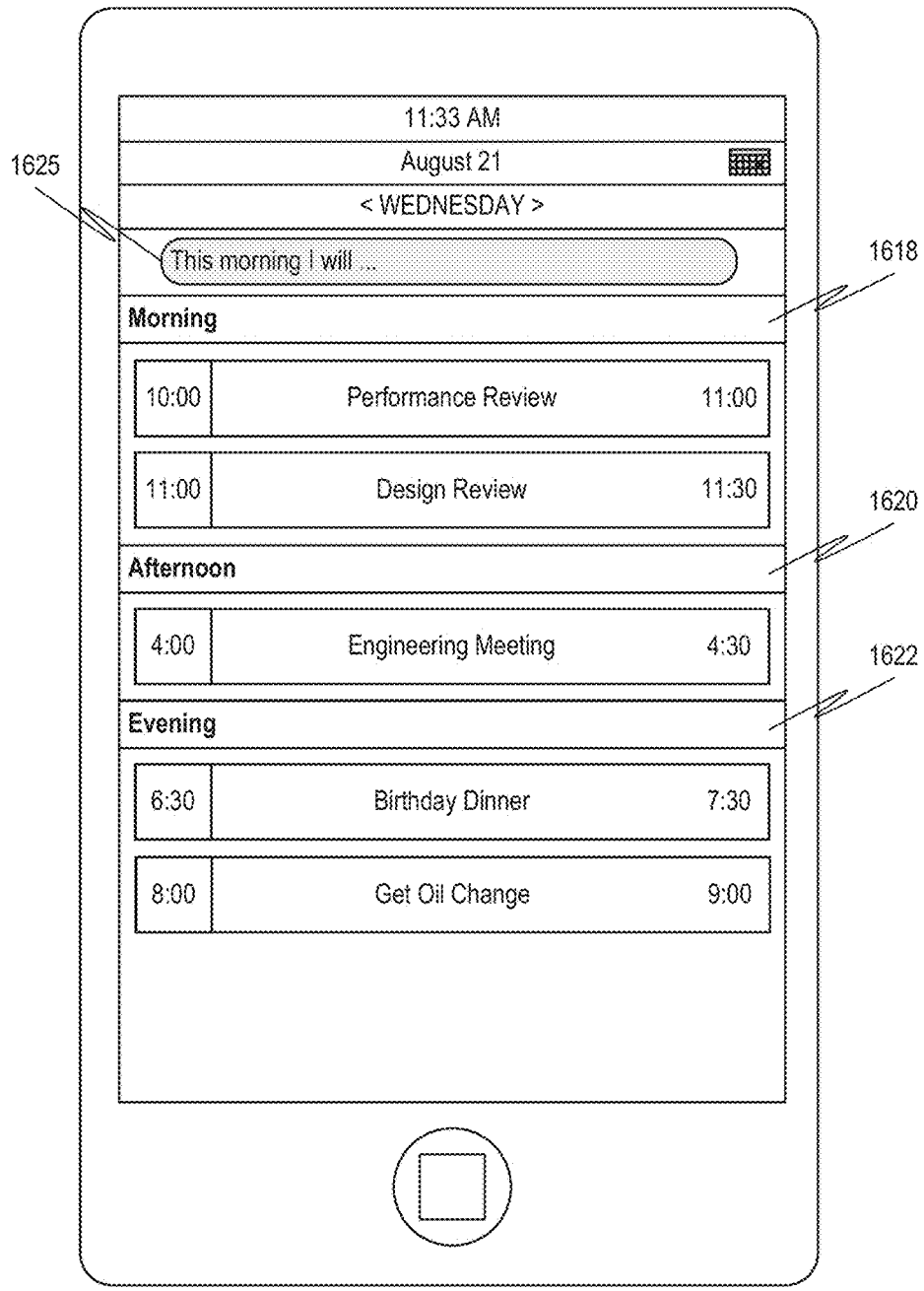
FIG. 16B is an interface diagram illustrating an alternative view of the day view of a collection of intention objects, according to some embodiments.

FIG. 16B is an interface diagram illustrating an additional iteration of the day view 1600 of a collection of intention objects, according to some embodiments. In particular, FIG. 16B illustrates the day view 1600 subsequent to a user scrolling through the intention objects 1604-1614. As illustrated in FIG. 16B, the day view 1600 now includes an updated intention prompt 1625. The updated intention prompt 1625 is presented to the user in response to the user scrolling down through the various intention objects comprising the day view. In particular, the updated intention prompt 1625 is presented to the user in response to the coarse time window 1618 being positioned at the top of the viewing interface. As such, the particular prompt presented to the user may correspond to the particular coarse time window being viewed by the user.

Figure 16C:
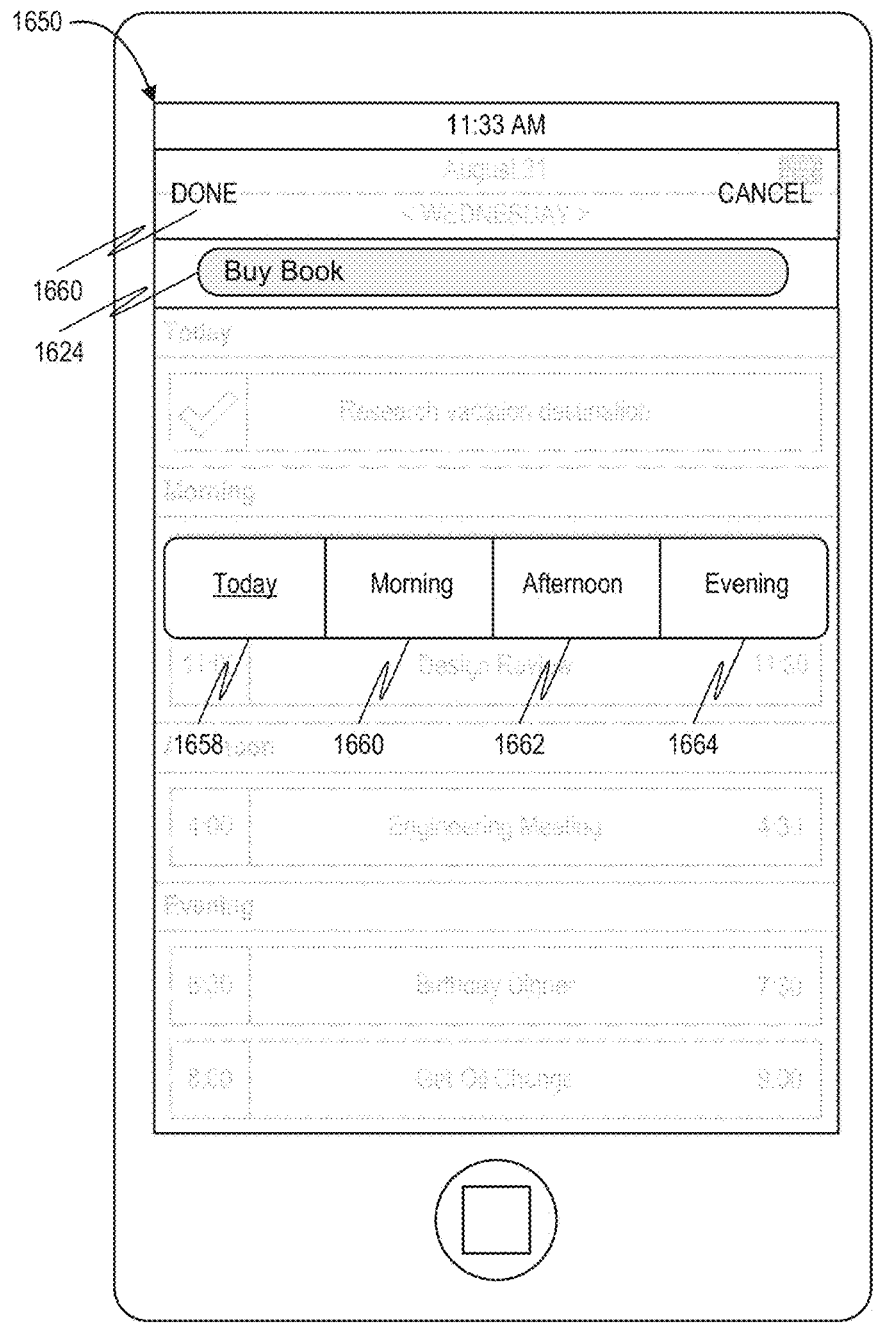
FIG. 16C is an interface diagram illustrating a portion of an intention object creation interface, according to some embodiments.

FIG. 16C is an interface diagram illustrating an intention object creation interface 1650, according to some embodiments. The intention object creation interface 1650 may be presented to a user in response to receiving input from the user in the intention prompt 1624, updated intention prompt 1625, or other iterations of an intention prompt. In some embodiments, the intention object creation interface 1650 may be presented as a translucent view overlaid on the day view 1600. The intention object creation interface 1650 may allow a user to create and commit an intention to undertake an activity (e.g., an intention object 300) to a coarse time window. To this end, the intention object creation interface 1650 includes time window selections 1658-1664. As illustrated in FIG. 16C, an intention to undertake an activity (e.g., "Buy Book") may be input into intention prompt 1624 and a selection of a time window selection 1658-1664 may assign the intention to the selected time window. In response to a selection of button 1660, a new intention object 300 may be created in accordance with the entered information. A graphical representation of the newly created intention object may subsequently be added to the day view 1600.

Figure 16D:
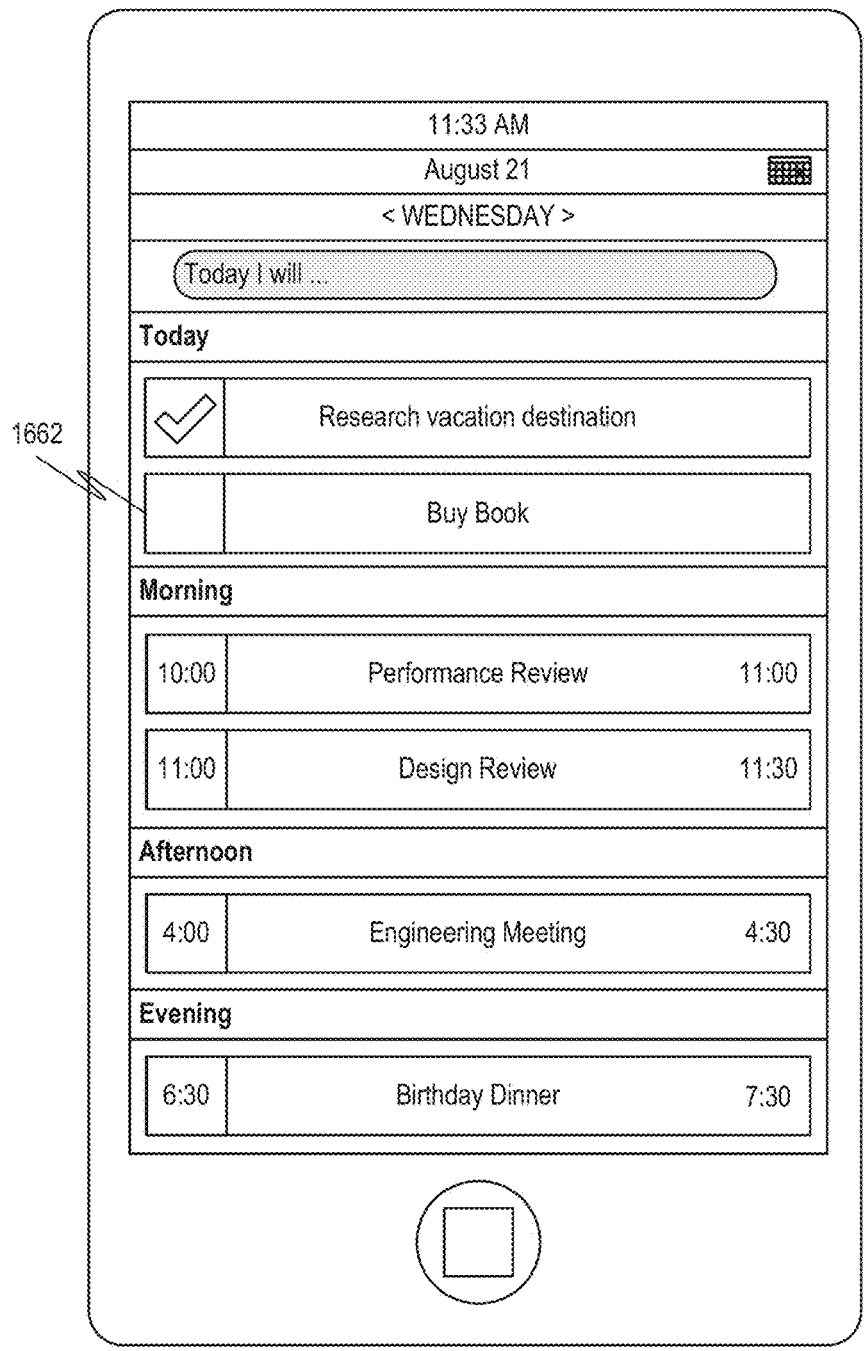
FIG. 16D is an interface diagram illustrating the day view including a newly created intention object, according to some embodiments.

FIG. 16D is an interface diagram illustrating the day view 1600 including a newly created intention object 1662, according to some embodiments. In particular, FIG. 16D illustrates the inclusion of a graphical representation of the intention object 1662 in the day view 1600. The intention object 1662 may be included in the day view 1600 upon creation of the intention object 1662 via the intention object creation interface 1650 discussed above in reference to FIG. 16C.

Example Client Device

Figure 17:
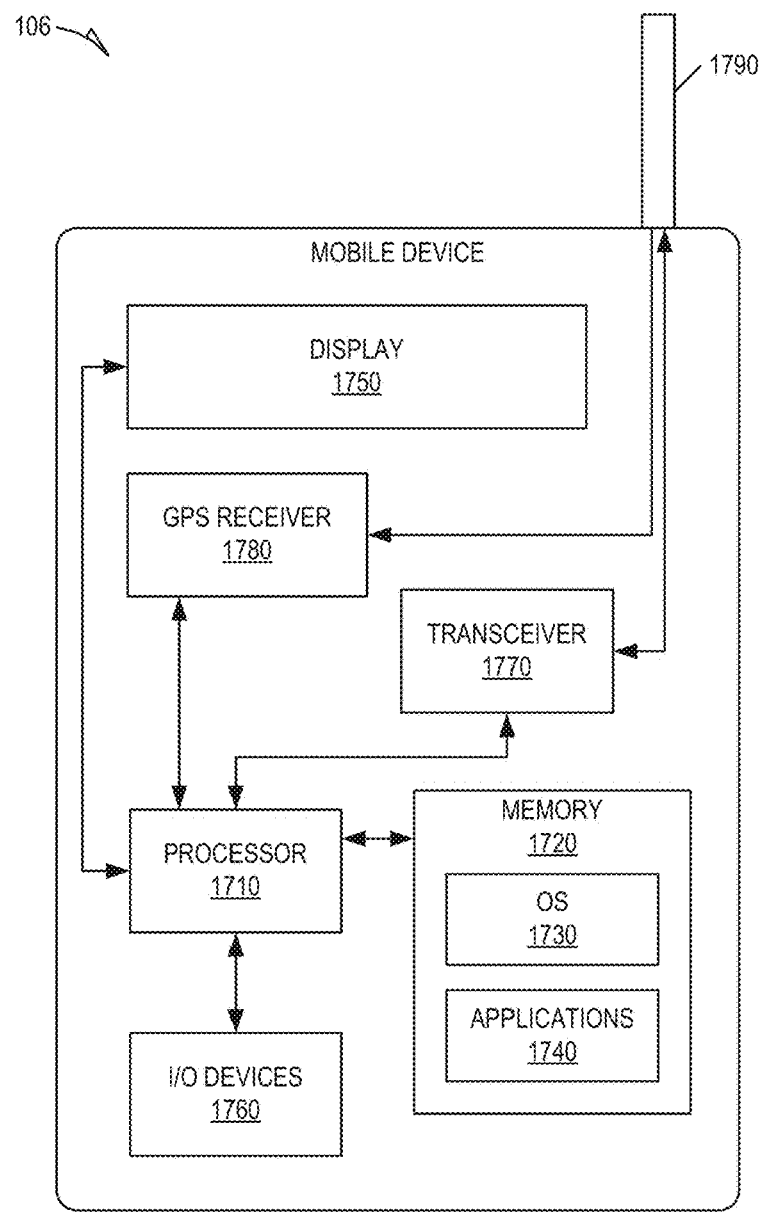
FIG. 17 is a block diagram illustrating a mobile device, according to an example embodiment.

FIG. 17 is a block diagram illustrating a client device 106, such as a mobile device, according to an example embodiment. The client device 106 may include a processor 1710. The processor 1710 may be any of a variety of different types of commercially available processors 1710 suitable for mobile devices (e.g., an XScale architecture microprocessor, a Microprocessor without Interlocked Pipeline Stages (MIPS) architecture processor, or another type of processor). A memory 1720, such as a random access memory (RAM), a Flash memory, or other type of memory, is typically accessible to the processor 1710. The memory 1720 may be adapted to store an operating system (OS) 1730, as well as application programs 1740, such as a mobile location enabled application that may provide location based services (e.g., physical location check-in) to a user. The processor 1710 may be coupled, either directly or via appropriate intermediary hardware, to a display 1750 and to one or more input/output (I/O) devices 1760, such as a keypad, a touch panel sensor, a microphone, and the like. Similarly, in some embodiments, the processor 1710 may be coupled to a transceiver 1770 that interfaces with an antenna 1790. The transceiver 1770 may be configured to both transmit and receive cellular network signals, wireless data signals, or other types of signals via the antenna 1790, depending on the nature of the client device 106. In this manner, the connection 112 with the network 104 (FIG. 1) may be established. Further, in some configurations, a GPS receiver 1780 may also make use of the antenna 1790 to receive GPS signals.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor 1710 or a group of processors 1710) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor 1710, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1710 that are temporarily configured (e.g., by software) or permanently configured to perform the relevant operations. Whether temporarily or permanently configured, such processors 1710 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1710 or processor-implemented modules. The performance of certain of the operations may be distributed among the one or more processors 1710, not only residing within a single machine, but deployed across a number of machines. In some example embodiments, the processor 1710 or processors may be located in a single location (e.g., within a home environment, an office environment or as a server farm), while in other embodiments the processors 1710 may be distributed across a number of locations.

The one or more processors 1710 may also operate to support performance of the relevant operations in a "cloud computing" environment or as a "software as a service" (SaaS). For example, at least some of the operations may be performed by a group of computers (as examples of machines including processors 1710), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 18:
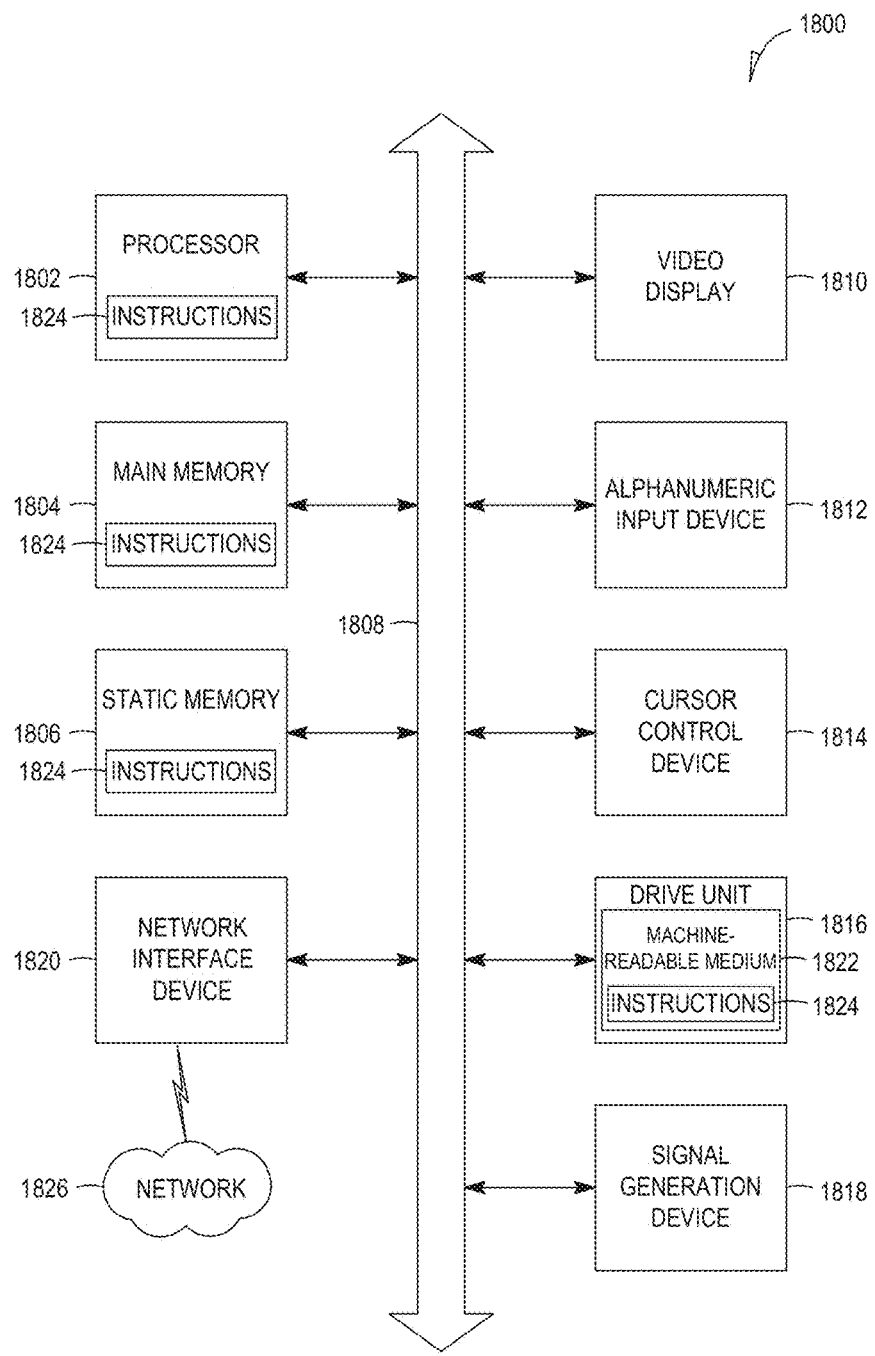
FIG. 18 is a diagrammatic representation of a machine in the example form of a computer system within which a set of instructions for causing the machine to perform any one or more of the methodologies discussed herein may be executed.

FIG. 18 is a block diagram of a machine in the example form of a computer system 1800 within which instructions 1824 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions 1824 to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a UI cursor control device 1814 (e.g., a mouse), a disk drive unit 1816, a signal generation device 1818 (e.g., a speaker), and a network interface device 1820.

Machine-Readable Medium

The disk drive unit 1816 includes a machine-readable medium 1822 on which is stored one or more sets of data structures and instructions 1824 (e.g., software) embodying or used by any one or more of the methodologies or functions described herein. The instructions 1824 may also reside, completely or at least partially, within the main memory 1804, static memory 1806, and/or within the processor 1802 during execution thereof by the computer system 1800, with the main memory 1804 and the processor 1802 also constituting machine-readable media 1822.

While the machine-readable medium 1822 is shown in an example embodiment to be a single medium, the term "machine-readable medium" may include a single medium or multiple media (e.g., a centralized or distributed database, and/or associated caches and servers) that store the one or more data structures or instructions 1824. The term "machine-readable medium" shall also be taken to include any tangible medium or tangible device that is capable of storing, encoding, or carrying instructions 1824 for execution by the machine and that cause the machine to perform any one or more of the methodologies of the present disclosure, or that is capable of storing, encoding or carrying data structures used by or associated with such instructions 1824. The term "machine-readable medium" shall accordingly be taken to include, but not be limited to, solid-state memories, and optical and magnetic media. Specific examples of machine-readable media include non-volatile memory, including by way of example, semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Transmission Medium

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying instructions 1824 for execution by the machine, and includes digital or analog communications signals or other intangible media to facilitate communication of such software.

Although the embodiments of the present inventive subject matter have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 316 C.F.R. § 1.162(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   presenting, in a free form spatial interface separate from a calendar, a plurality of intention objects for respectively corresponding activities a user intends to undertake, each of the intention objects comprising a data structure including a plurality of activity attributes of the corresponding activity, the plurality of activity attributes including one or more temporal attributes and a category, the free form spatial interface enabling the user to manipulate the intention objects, including to create dependent intention objects wherein a first intention object is on top of a second intention object, the free form spatial interface including a control for presenting or hiding the second intention object;
   assigning, in the calendar, each of the intention objects to a respective one of multiple preexisting coarse time windows that are independent of the intention objects, a number of the multiple preexisting coarse time windows being based on user preference, the assigning each of the intention objects to a respective one of the multiple preexisting coarse time windows including:
      assigning a first intention object of the plurality of intention objects to a first preexisting coarse time window based on the one or more temporal attributes of the first intention object, a location of the user, and the category of the first intention object; and
      assigning a second intention object of the plurality of intention objects to a second preexisting coarse time window based on the one or more temporal attributes of the second intention object;
   presenting, in the calendar and on a user device operated by the user, a view of intention objects for which a relevancy rank meets a predefined threshold, the view including a graphical representation of the first and second intention objects, the view being divided into at least the first and second preexisting coarse time windows;
   reassigning the first intention object from the first preexisting coarse time window to the second preexisting coarse time window in response to user input; and
   in response to a selection of an executable action item associated with the first intention object, opening at least one of a browser application and an email application to enable the user to undertake the activity corresponding to the first intention object.

2. The method of claim 1, further comprising receiving, from the user device, activity data defining an intention of the user to undertake an additional activity, the activity data including a third preexisting coarse time window for undertaking the additional activity.

3. The method of claim 1, further comprising:
   receiving user input to reassign the first intention object to a third preexisting coarse time window; and
   in response to receiving the user input, reassigning the first intention object to the third preexisting coarse time window.

4. The method of claim 3, wherein the user input is a single touch-based gesture.

5. The method of claim 1, wherein each respective preexisting coarse time window is selected from the group comprising:
   morning,
   afternoon, and
   night.

6. The method of claim 1, further comprising:
   receiving user input indicating that the activity defined by the plurality of activity attributes of the first intention object has been completed; and
   presenting a completion indicator in conjunction with the graphical representation of the first intention object.

7. The method of claim 1, wherein the one or more temporal attributes included in the plurality of activity attributes of the first intention object includes an approximate time for undertaking the activity.

8. The method of claim 1, wherein the plurality of activity attributes include at least one contextual attribute identifying a context for undertaking the activity.

9. The method of claim 8, further comprising detecting an occurrence of a context event, the context event being related to a context for undertaking the activity defined by the plurality of activity attributes included in the first intention object, wherein the first intention object is assigned to the first preexisting coarse time window in response to detecting the occurrence of the context event.

10. The method of claim 9, wherein the at least one contextual attribute is selected from the group:
    a location,
    a mental state of the user,
    a proximity to another user,
    a mode of transportation, or
    a season.

11. A non-transitory machine-readable storage medium embodying instructions that, when executed by a machine, cause the machine to perform operations comprising:
    presenting, in a free form spatial interface separate from a calendar, a plurality of intention objects for respectively corresponding activities a user intends to undertake, each of the intention objects comprising a data structure including a plurality of activity attributes of the corresponding activity, the plurality of activity attributes including one or more temporal attributes and a category, the free form spatial interface enabling the user to manipulate the intention objects, including to create dependent intention objects wherein a first intention object is on top of a second intention object, the free form spatial interface including a control for presenting or hiding the second intention object;

assigning, in the calendar, each of the intention objects to a respective one of multiple preexisting coarse time windows that are independent of the intention objects, a number of the multiple preexisting coarse time windows being based on user preference, the assigning each of the intention objects to a respective one of the multiple preexisting coarse time windows including:

assigning a first intention object of the plurality of intention objects to a first preexisting coarse time window based on the one or more temporal attributes of the first intention object, a location of the user, and the category of the first intention object; and assigning a second intention object of the plurality of intention objects to a second preexisting coarse time window based on the one or more temporal attributes of the second intention object;

presenting, in the calendar and on a user device operated by a user, a view of intention objects for which a relevancy rank meets or exceeds a predefined threshold, the view including a graphical representation of the first and second intention objects, the view being divided into at least the first and second preexisting coarse time windows;

reassigning the first intention object from the first preexisting coarse time window to the second preexisting coarse time window in response to user input; and in response to a selection of an executable action item associated with the first intention object, opening at least one of a browser application and an email application to enable the user to undertake the activity corresponding to the first intention object.

12. The non-transitory machine-readable storage medium of claim 11, further comprising instructions that, when executed by the machine, cause the machine to receive, from the user device, activity data defining an intention of the user to undertake an additional activity, the activity data including a third preexisting coarse time window for undertaking the additional activity.

13. The non-transitory machine-readable storage medium of claim 12, further comprising instructions that, when executed by the machine, cause the machine to present, on the user device, an updated view, the updated view including a graphical representation of the additional activity and the first and second intention objects.

14. The non-transitory machine-readable storage medium of claim 11, wherein the first and second preexisting coarse time windows are identical.

15. The non-transitory machine-readable storage medium of claim 11, wherein the one or more temporal attributes included in the plurality of activity attributes of the first intention object includes a time range.

16. A system comprising:
a processor of a machine;
a non-transitory machine-readable storage medium storing a set of intention objects for activities a user intends to undertake, each of the intention objects comprising a data structure including a plurality of activity attributes of the corresponding activity, the plurality of activity attributes including one or more temporal attributes and a category;
an assignment module to assign, using the processor of the machine, each intention object of the set of intention objects to a respective preexisting coarse time window based on the one or more temporal attributes of each respective intention object, a location of the user, and the category of the intention object, a number of the preexisting coarse time windows being based on user preference;
an interface module to cause a view of intention objects to be presented on a user device of the user, the view including a graphical representation of at least a portion of the set of intention objects for which a relevancy rank meets or exceeds a predefined threshold, the view being arranged by a plurality of preexisting coarse time windows that are independent of the intention objects, wherein the interface module also causes a free form spatial interface separate from a calendar to be presented on the user device, the free form spatial interface enabling the user to manipulate the intention objects, including to create dependent intention objects wherein a first intention object is on top of a second intention object, the free form spatial interface including a control for presenting or hiding the second intention object;
a reassignment module to reassign a first intention object from a first preexisting coarse time window to a second preexisting coarse time window in response to user input; and
an application opener to open, in response to a selection of an executable action item associated with the first intention object, at least one of a browser application and an email application to enable the user to undertake the activity corresponding to the first intention object.

17. The method of claim 1, wherein the at least one of the browser application and the email application includes the browser application.

18. The method of claim 1, wherein the at least one of the browser application and the email application includes the email application.

19. The non-transitory machine-readable storage medium of claim 11, wherein the at least one of the browser application and the email application includes the browser application.

20. The non-transitory machine-readable storage medium of claim 11, wherein the at least one of the browser application and the email application includes the email application.

* * * * *